US011854135B2

(12) United States Patent
Kovar

(10) Patent No.: US 11,854,135 B2
(45) Date of Patent: Dec. 26, 2023

(54) SYSTEMS AND METHODS FOR AUTHORING CROSS-BROWSER HTML 5 MOTION PATH ANIMATION

(71) Applicant: GOOGLE LLC, Mountain View, CA (US)

(72) Inventor: Lucas Kovar, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/369,287

(22) Filed: Jul. 7, 2021

(65) Prior Publication Data

US 2021/0335027 A1 Oct. 28, 2021

Related U.S. Application Data

(63) Continuation of application No. 16/489,211, filed as application No. PCT/US2017/066510 on Dec. 14, 2017, now Pat. No. 11,069,110.

(Continued)

(51) Int. Cl.
*G06T 17/00* (2006.01)
*G06T 13/00* (2011.01)
(Continued)

(52) U.S. Cl.
CPC ............ *G06T 13/00* (2013.01); *G06F 16/972* (2019.01); *G06F 16/986* (2019.01);
(Continued)

(58) Field of Classification Search
CPC ......... G06T 17/20; G06T 19/00; G06T 17/00; G06T 17/10; G06T 17/005
(Continued)

(56) References Cited

U.S. PATENT DOCUMENTS 8,164,596 B1 4/2012 Bech
8,212,821 B1 7/2012 Kopylov et al.
(Continued)

FOREIGN PATENT DOCUMENTS

CN 102142016 A 8/2011
CN 102253979 A 11/2011
(Continued)

OTHER PUBLICATIONS

Dahlstrom, Erik et al., "Scalable Vector Graphics (SVG) 1.1 (Second Edition) W3C Recommendation—Chapter 19: Animation," World Wide Web Consortium (W3C) SVG 1.1 (second edition), dated Aug. 16, 2011, XF002778019, Retrieved from the Internet: URL:https://www.w3.org/TR/SVG/animate.html #PathAttribute (29 pages).

(Continued)

*Primary Examiner* — Gordon G Liu
(74) *Attorney, Agent, or Firm* — MARSHALL, GERSTEIN & BORUN LLP

(57) ABSTRACT

The present disclosure provides systems and methods for implementations of motion paths via pure CSS3 and HTML5, working in all major browsers and requiring no JavaScript. For each motion path degree of freedom (e.g., x translation), the system may insert an additional element into the document object model (DOM) to host its animation. In some implementations, the system may apply an optimization process to fit CSS3 keyframes rules that approximate the ideal motion path trajectory to a predetermined tolerance while minimizing the storage footprint. In addition to supporting CSS3 motion paths, this authoring model retains the ability to supply arbitrary standard CSS3 animations to transform channels, which allows users to, e.g., animate the scale and rotation of an element independent of its progress along a motion path.

20 Claims, 14 Drawing Sheets

Related U.S. Application Data

(60) Provisional application No. 62/519,141, filed on Jun. 13, 2017.

(51) Int. Cl.
*G06F 16/958* (2019.01)
*G06T 11/20* (2006.01)
*G06T 13/20* (2011.01)
*G06F 40/143* (2020.01)

(52) U.S. Cl.
CPC .......... *G06F 40/143* (2020.01); *G06T 11/203* (2013.01); *G06T 13/20* (2013.01); *G06T 17/005* (2013.01)

(58) Field of Classification Search
USPC .......................................................... 345/420
See application file for complete search history.

(56) References Cited

U.S. PATENT DOCUMENTS

| | | | |
|---|---|---|---|
| 9,208,054 B2 | 12/2015 | Prasad | |
| 11,069,110 B2 | 7/2021 | Kovar | |
| 2010/0214313 A1* | 8/2010 | Herman | G06T 13/40 345/593 |
| 2011/0191676 A1 | 8/2011 | Guttman et al. | |
| 2013/0088495 A1* | 4/2013 | Bech | G06T 13/00 345/467 |
| 2013/0219344 A1 | 8/2013 | Zyracki et al. | |
| 2013/0346851 A1 | 12/2013 | Leece | |
| 2014/0298159 A1* | 10/2014 | Kim | G06F 40/143 715/234 |
| 2015/0120080 A1 | 4/2015 | Densham | |

FOREIGN PATENT DOCUMENTS

| | | |
|---|---|---|
| CN | 103345522 A | 10/2013 |
| CN | 105094804 A | 11/2015 |
| WO | WO-2014/022981 A1 | 2/2014 |

OTHER PUBLICATIONS

Examination Report for EP Appln. Ser. No. 17828815.5 dated Apr. 14, 2021 (7 pages).
International Preliminary Report on Patentability, Ch. I, for PCT Appln. Ser. No. PCT/US2017/066510 dated Dec. 26, 2019 (8 pages).
International Search Report and Written Opinion on Appln. Ser. No. PCT/US2017/066510 dated Mar. 13, 2018 (15 pages).
Perna, Maria Antonietta, "animating the DOM with Anime.js," Sitepoint, dated Nov. 9, 2016, XP002778020, Retrieved from the Internet: URL: https://www.sitepoint.com/animating-the-dom-with-anime-js/ (12 pages).
W3C, Scalable Vector Graphics (SVG) 1.1 (Second Edition) (W3C Recommendation Aug. 16, 2011). [online], [Retrieved on Aug. 24, 2020], Retrieved from theInternet: <URL: https://www.w3.org/TR/SVG11/REC-SVG11-20110816.pdf> (Year: 2011).
Office Action, Indian Patent Application No. 201927028982, dated Aug. 11, 2021.
First Office Action for Chinese Application No. 201780085242.7, dated Dec. 2, 2022.

* cited by examiner

SYSTEMS AND METHODS FOR AUTHORING CROSS-BROWSER HTML 5 MOTION PATH ANIMATION

RELATED APPLICATIONS

The present application claims priority under 35 U.S.C. § 120 as a continuation of U.S. patent application Ser. No. 16/489,211, entitled "Systems and Methods for Authoring Cross-Browser HTML 5 Motion Path Animation," filed Aug. 27, 2019, which is a National Stage Application under 35 U.S.C. § 371 of International Patent Application No. PCT/US2017/066510, entitled "Systems and Methods for Authoring Cross-Browser HTML 5 Motion Path Animation," filed Dec. 14, 2017, which claims the benefit of and priority to U.S. Provisional Application No. 62/519,141, entitled "Systems and Methods for Authoring Cross-Browser HTML 5 Motion Path Animation," filed Jun. 13, 2017, each of which is incorporated by reference herein in their entirety.

BACKGROUND

A "motion path" is a common animation abstraction used to move objects along a curve. Users control the animation by defining the curve shape (e.g., a cubic Bezier curve), by defining how fast the object travels along the curve (which may be as simple as a constant speed, but which may also include a complex sequence of accelerations, decelerations, pauses, and teleportations), and by specifying whether the object orients itself to point along the path's tangent ("tangent following"). All major web browsers natively support animation via CSS3 keyframes rules, but there is no widely-adopted standard for motion path animation. Users that want to create cross-browser motion path animation must rely on JavaScript libraries that add overhead to loading a web page and that do not provide the same run time performance guarantees as CSS3.

SUMMARY

The systems and methods discussed herein provide implementations of motion paths via pure CSS3 and HTML5, working in all major browsers and requiring no JavaScript. Animation is created solely using CSS3 keyframes rules, which is nontrivial for two reasons: 1) to follow a motion path in 2D, x translation, y translation, and z rotation must each be animated independently, but CSS3 cannot apply different animations to different transform channels of a single element; and 2) CSS3 represents animation using 2D cubic Bezier curves that relate time to value, and this format cannot represent the true motion path animation curves, which do not have a closed-form representation.

Instead, for each motion path degree of freedom (e.g., x translation), the system may insert an additional element into the document object model (DOM) to host its animation. In some implementations, the system may apply an optimization process to fit CSS3 keyframes rules that approximate the ideal motion path trajectory to a predetermined tolerance while minimizing the storage footprint. In addition to supporting CSS3 motion paths, this authoring model retains the ability to supply arbitrary standard CSS3 animations to transform channels, which allows users to, e.g., animate the scale and rotation of an element independent of its progress along a motion path.

In one aspect, the present disclosure is directed to a method for generating cross-browser compatible animations. The method includes receiving, by a computing device, a web page comprising an element to be animated, the web page including a document object model (DOM) tree having a node corresponding to the element. The method includes receiving, by the computing device, a motion path for the element comprising a plurality of degrees of freedom. The method includes inserting into the DOM tree, by the computing device, a first parent node having the node corresponding to the element as a child, the first parent node corresponding to a first degree of freedom of the plurality of degrees of freedom. The method includes inserting into the DOM tree, by the computing device, a second parent node having the first parent node as a child, the second parent node corresponding to a second degree of freedom of the plurality of degrees of freedom.

In some implementations, the method includes iteratively inserting into the DOM tree additional parent nodes for each additional degree of freedom of the plurality of degrees of freedom. In some implementations, the method includes receiving, by the computing device, an input scale factor for the element; inserting a first scale factor into the first parent node, by the computing device; and inserting a second scale factor into the second parent node, by the computing device; and a sum of the first scale factor and second scale factor equals the input scale factor.

In some implementations, the method includes receiving a Bezier curve segment; generating a first sequence of keys and key times corresponding to the Bezier curve segment in the first degree of freedom; and generating a second sequence of keys and key times corresponding to the Bezier curve segment in the second degree of freedom. In a further implementation, the first Bezier curve segment has a first easing function; and the method includes receiving a second Bezier curve segment having a second easing function. In a still further implementation, the method includes inserting a first easing key corresponding to the first easing function into the first parent node, and inserting a second easing key corresponding to the second easing function into the second parent node. In another further implementation, the method includes iteratively subdividing the Bezier curve segment into a plurality of sub-segments at a plurality of sampling points and interpolating between sampling points to identify the first sequence of keys and key times and second sequence of keys and key times.

In some implementations of the method, the plurality of degrees of freedom includes at least one translation. In some implementations of the method, the plurality of degrees of freedom includes at least one rotation.

In some implementations, the method includes transmitting the web page to a second computing device, the second computing device rendering the animated element according to the second parent node, first parent node, and node corresponding to the element.

In another aspect, the present disclosure is directed to a system for generating cross-browser compatible animations. The system includes a computing device comprising a processor executing an animator, and a memory device. The animator is configured to receive a web page stored in the memory device comprising an element to be animated, the web page including a document object model (DOM) tree having a node corresponding to the element. The animator is also configured to receive a motion path for the element comprising a plurality of degrees of freedom. The animator is also configured to insert into the DOM tree a first parent node having the node corresponding to the element as a child, the first parent node corresponding to a first degree of freedom of the plurality of degrees of freedom. The animator is also configured to insert into the DOM tree a second parent node having the first parent node as a child, the second parent node corresponding to a second degree of freedom of the plurality of degrees of freedom.

In some implementations, the animator is further configured to iteratively insert into the DOM tree additional parent nodes for each additional degree of freedom of the plurality of degrees of freedom. In some implementations, the animator is further configured to: receive an input scale factor for the element; insert a first scale factor into the first parent node, by the computing device; and insert a second scale factor into the second parent node, by the computing device; and a sum of the first scale factor and second scale factor equals the input scale factor.

In some implementations, the animator is further configured to: receive a Bezier curve segment; generate a first sequence of keys and key times corresponding to the Bezier curve segment in the first degree of freedom; and generate a second sequence of keys and key times corresponding to the Bezier curve segment in the second degree of freedom. In a further implementation, the first Bezier curve segment has a first easing function; and the animator is further configured to receive second Bezier curve segment having a second easing function. In a still further implementation, the animator is further configured to insert a first easing key corresponding to the first easing function into the first parent node, and insert a second easing key corresponding to the second easing function into the second parent node. In another further implementation, the animator is further configured to iteratively subdivide the Bezier curve segment into a plurality of sub-segments at a plurality of sampling points and interpolate between sampling points to identify the first sequence of keys and key times and second sequence of keys and key times.

In some implementations of the system, the plurality of degrees of freedom includes at least one translation. In some implementations of the system, the plurality of degrees of freedom includes at least one rotation.

In some implementations of the system, the computing device further comprises a network interface configured to transmit the web page to a second computing device, the second computing device rendering the animated element according to the second parent node, first parent node, and node corresponding to the element.

These implementations are mentioned not to limit or define the scope of the disclosure, but to aid in understanding it. Particular implementations may be developed to realize one or more of the following advantages. By improving depiction of a motion path, a user is better able to understand the motion being depicted. In example implementations in which the depicted motion of an object represents 3D motion of an object, particular implementations described herein may more accurately represent the 3D motion in 2D. Further, the advantages provided by particular implementations described herein are obtained using native or commonly installed applications (e.g. browsers) and without requiring a user to install new software (e.g. extensions).

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1A:
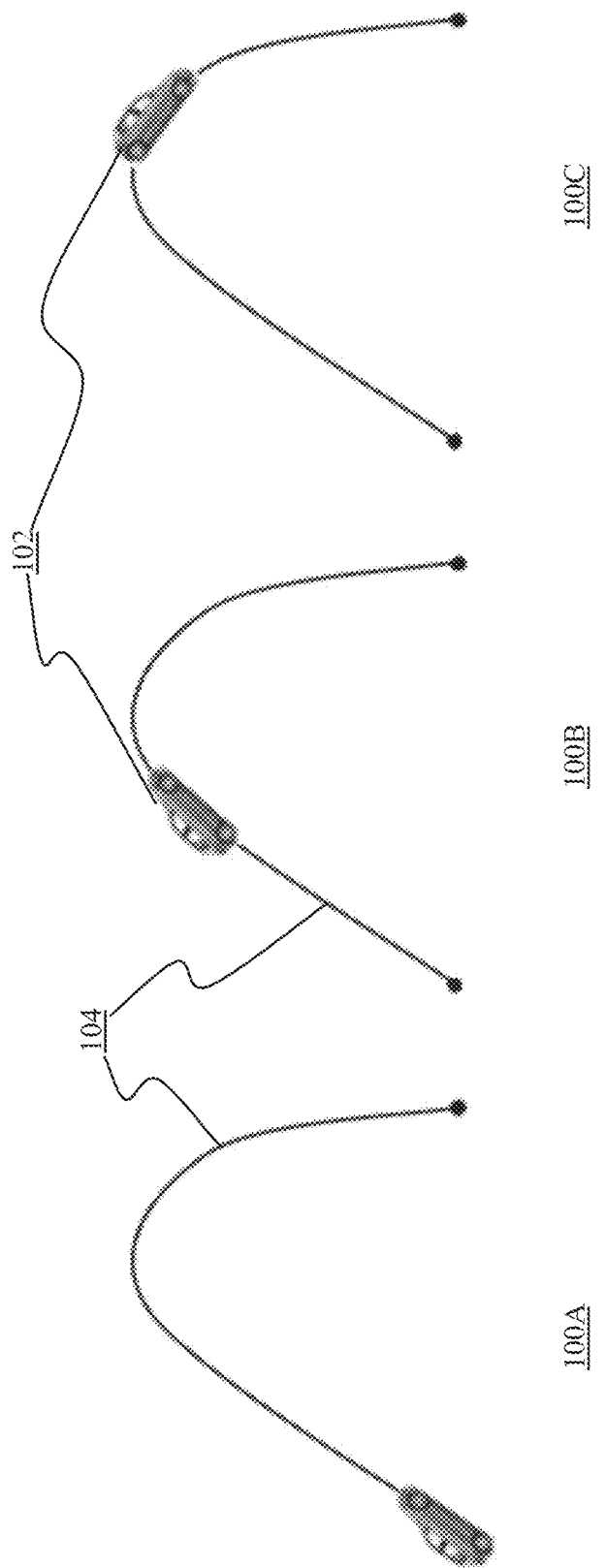
FIG. 1A is a diagram of an example implementation of a motion path.

The systems and methods discussed herein provide implementations of motion paths, or animation abstraction used to move objects along a curve, via pure CSS3 and HTML5, working in all major browsers and requiring no JavaScript. Motion paths may include a defined curve shape (e.g., a cubic Bezier curve), a definition of how fast the object travels along the curve (which may be as simple as a constant speed, but which may also include a complex sequence of accelerations, decelerations, pauses, and teleportations), and an indication of whether the object orients itself to point along the path's tangent ("tangent following"). Animation may be created using CSS3 keyframes rules, which is nontrivial for two reasons: 1) to follow a motion path in 2D, x translation, y translation, and z rotation must each be animated independently, but CSS3 cannot apply different animations to different transform channels of a single element; and 2) CSS3 represents animation using 2D cubic Bezier curves that relate time to value, and this format cannot represent the true motion path animation curves, which do not have a closed-form representation.

For each motion path degree of freedom (e.g., x translation)) animated by a motion path, the system may insert an additional parent element into the document object model (DOM) hierarchy to host the necessary animation. The original element may be animated as usual (e.g., to achieve effects like scaling or out-of-plane rotation), and the motion path transform is applied on top of this. To support responsive content, the system may use media rules to apply different versions of a motion path (say, a smaller version and a larger version) to screens of different sizes. Since the intermediate elements needed by the motion path may add clutter to the document being authored, and would possibly confuse the user, they system may, in some implementations, explicitly add them only when generating the final document that is to be served.

The authored CSS rules may be updated so the final computed styles applied to the path element are unchanged. For example, consider the case where the width and height of the original element are both set to 50%, or half the size of its parent. The system may adjust the rules so the width and height of the most ancestral intermediate element is 50%, and the width and height of both the original element and the remaining intermediate elements are 100%. To represent a motion path animation in CSS3, the system may use an optimization process to generate approximating keyframes rules. The ideal motion path animation may be thought of as three function x(t), y(t), and r(t) that define the translation and rotation at any time. The system may sample these functions and fit approximating linear and cubic 2D Bezier splines with the property that the time dimension is strictly increasing; this is readily converted to CSS3 keyframes, which are similarly based on cubic Bezier curves. The fit animation curves may be within a user-controllable tolerance epsilon (eps) of the samples: if X(t) approximates x(t), then for the ith sample x(t_i), |X(t_i)−x(t_i)|≤eps. The system may perform an optimization that minimizes an estimate of the storage footprint of the motion paths in the compressed document.

Advantages of this approach include that the output animation naturally synchronizes with other CSS animations (e.g., to animate an element's opacity). A JavaScript-based solution, in contrast, would only guarantee to synchronicity if all animation were done in JavaScript, and CSS animation has better general performance characteristics. Furthermore, the optimization process keeps the generated CSS as compact as possible (thereby lowering loading time) without sacrificing visual fidelity. Additionally, the author-time experience is not impeded by the HTML5 constructs needed to represent motion paths. Instead, the natural author-time abstraction (a path followed by the element) is compiled down to HTML5 as part of preparing the document for serving. As long as the document contains the original authored motion path state (geometry plus speed function), the creation of CSS3 keys could be deferred until runtime (i.e., when the document is loaded by the end user). For efficiency, the optimization step may be skipped, and instead the motion path may be translated into dense linear keyframes.

At present, typical CSS animation can only animate along straight lines between keys. To animate along a curve, a user must add many closely-spaced keys to create an approximating sequence of line segments, which is prohibitively difficult to author and edit. Most animation authoring tools instead offer the ability to create motion paths, which are curves that define the trajectory followed by an animated object. FIG. 1 shows an example implementation of a motion path with snapshots 100A-100C at various times during animation. An element or object 102 is moved along the geometry of the path 104, and the element's orientation is constrained to follow the path tangent. Users control the animation by adjusting the path's shape, by defining how fast the object travels along the path (which may be as simple as a constant speed, but may also include a complex sequence of accelerations, decelerations, pauses, and teleportations), and by specifying whether the object orients itself to point along the path's tangent.

Described herein are systems and methods for supporting motion paths. While motion paths are a simple and commonly-used abstraction, the limitations of HTML5 complicate the implementation. Since there is no native support for motion paths, the system directly uses CSS3 keyframes rules. Not only are keyframes rules unable to exactly represent motion paths, but to apply a motion path to an element, the system must add additional elements to the DOM hierarchy and assign them a coordinated set of animations. In some implementations, motion paths are approximated to a suitable tolerance (e.g., half a pixel) by fitting CSS3 keyframes rules, using the degrees of freedom offered by setting independent custom eases (via cubic-bezier) for each relevant transform channel. This allows arbitrary motion path animations to be created without requiring a custom javascript runtime. Additionally, in some implementations, to make motion paths easier to work with at author time, the additional DOM structure needed at run time is omitted, and the associated keyframes rules (which can be ungainly) are stored in a separate, automatically generated CSS file. The publish process restores all state information needed to play back a motion path, so again no javascript is needed at run time.

Motion paths may be treated in the timeline like any other animation, so all existing functionality behaves normally and with no additional user interface interactions needed, including the ability to re-time, loop, pause, and jump to different points in an animation. In some implementations, motion paths could be implemented as a javascript runtime that updates element positions and orientations via requestAnimationFrame. However:

Javascript-based animation can be less performant than CSS3 animation, because its execution thread is generally also used for other computation. In particular, an advertisement must share this thread both with the main content and with other ads;

Javascript-based animation cannot in general be synchronized with CSS3 animation; and to provide the same control available to standard animations, the runtime may need to re-implement existing editor functionality, including pause and goto actions, and the ability to define different animations for different viewport size ranges, which is otherwise handled via media rules. In many cases, a custom runtime would require more storage than the equivalent CSS.

Workflow Overview

This section walks through an example workflow for creating and editing a motion path. FIGS. 1B-1E are screenshots of an implementation of an animation editor 106 for creating and editing a motion path. The user interface of the Figures is strictly illustrative.

Figure 1B:
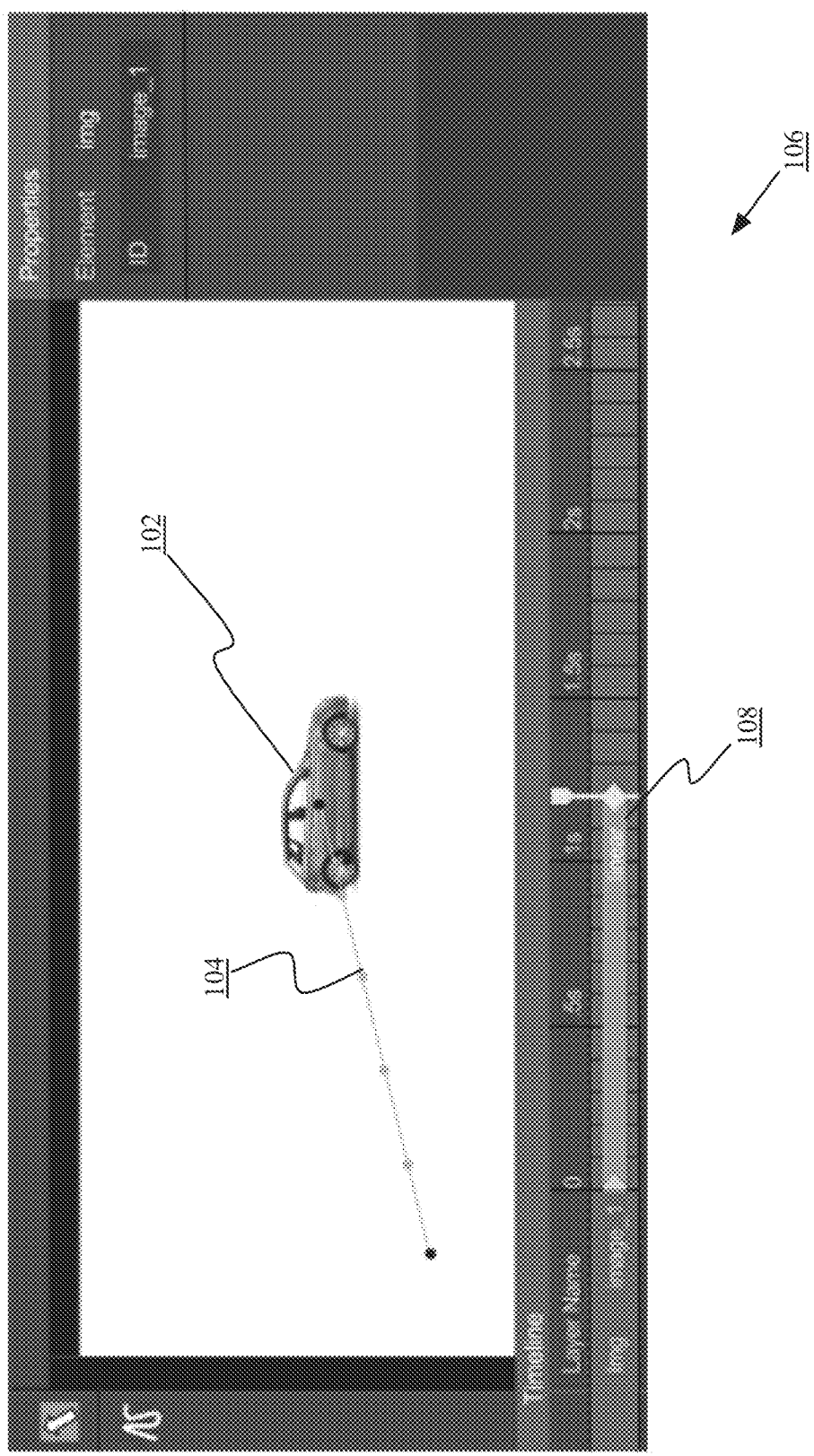
FIGS. 1B-1E are screenshots of an implementation of an animation editor for creating and editing a motion path.

First, as shown in FIG. 1B, the user adds an image or element 102 to the document and sets a position key. When the image is selected, the line 104 it travels along is visible on stage, along with handles at evenly spaced points. This line may be thought of as a simple motion path, although no motion path object is created internally. In some implementations, if a single element with an animated position is selected, its path is shown on stage. To reduce visual clutter, in some implementations, these paths are not shown if multiple elements are selected.

Figure 1C:
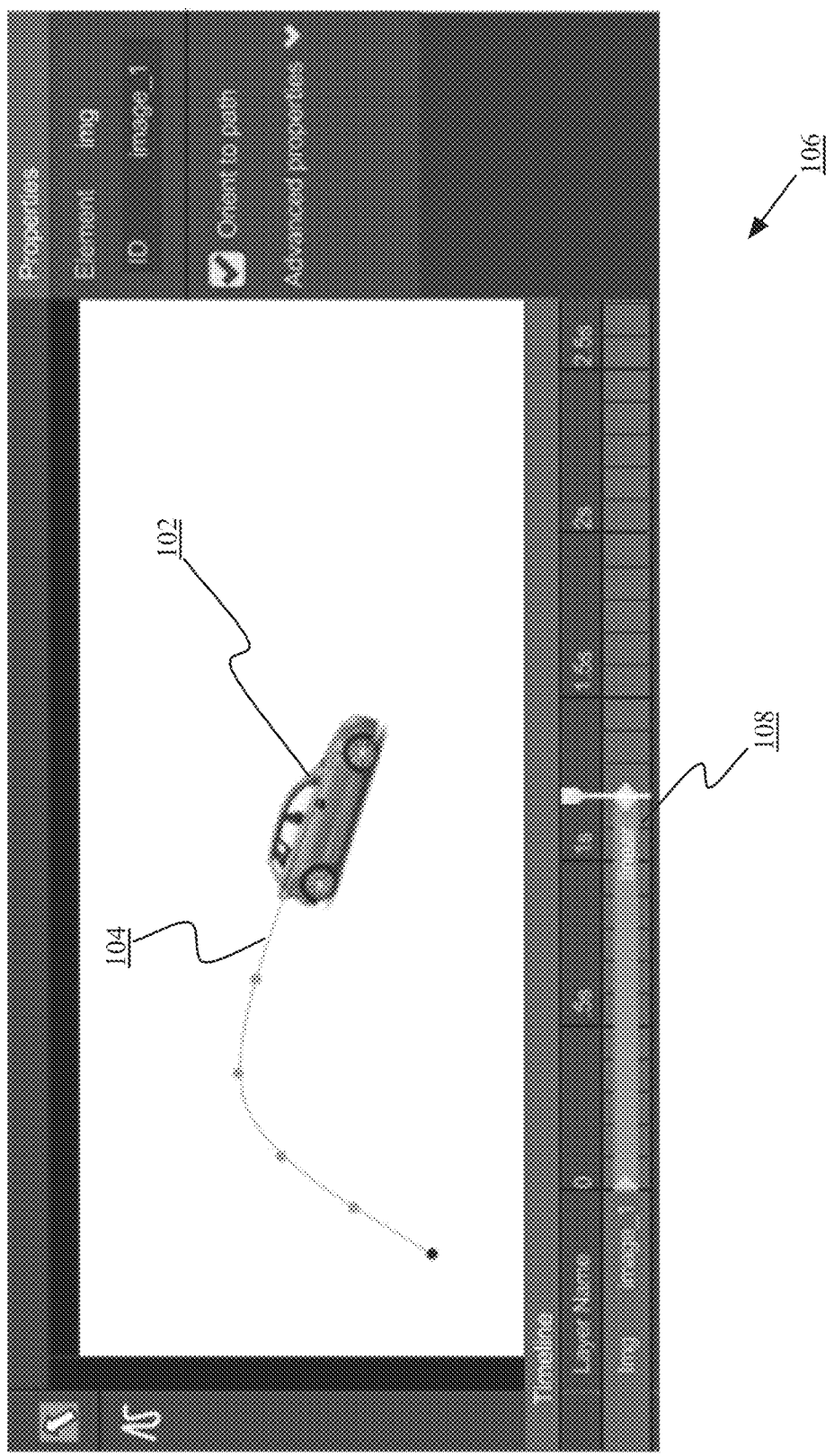

Using the selection tool, the user now drags one of the path handles or a portion of the line, altering its shape and implicitly creating a motion path animation as shown in FIG. 1C. In some implementations, dragging anywhere near in the line may alter the path, while dragging a dot or handle may alter the ease (sometimes referred to as inertia or curvature) along the path. The animation still starts and ends at the original times as shown in timeline 108, and by default, the element travels along the path at a constant speed. Changing the starting or ending key time alters this speed, and more generally, the timeline span's easing defines the evolution of the element's distance along the path; for example, ease-in causes the element to accelerate from a standstill. Finally, when an element with a motion path is selected, the property inspector on the right of interface 106 contains a new section with a toggle for making the element's orientation relative to the path. If this toggle is active, and no additional rotation keys are set, then the element points along the path's tangent. The property inspector also contains advanced settings related to fitting CSS3 keyframes to the motion path.

Figure 1D:
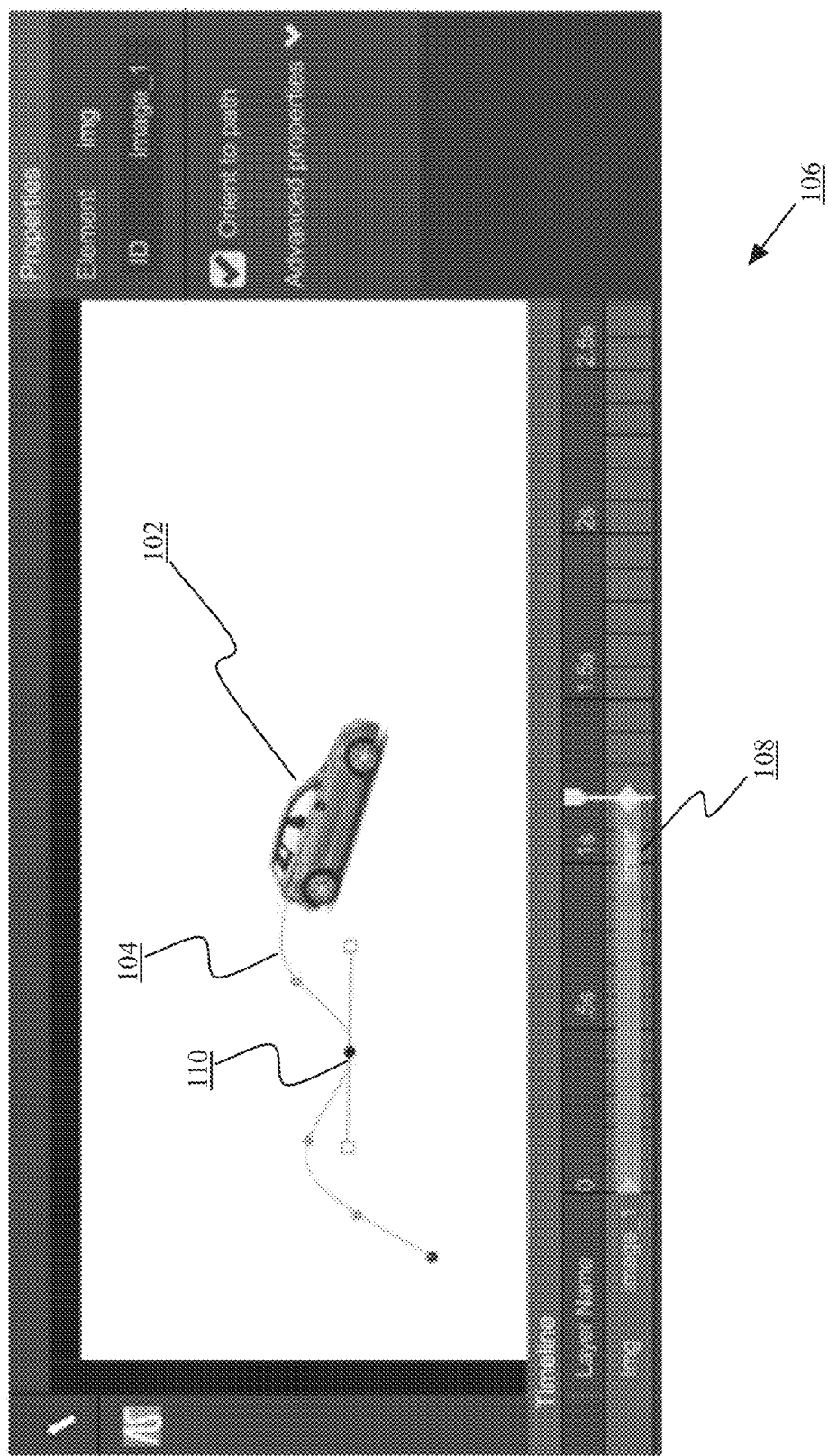

The user cannot add new control points using the selection tool, so the path shape is limited to a single cubic Bezier segment. For more control, in some implementations, a separate motion path tool can be used to directly edit the underlying Bezier curve (although referred to as separate, in some implementations, the motion path tool may be a context-sensitive mode of the same tool, or a modifier-key controlled mode of the same tool). As with the pen tool, the user can manipulate tangents and add or remove control points, as shown in FIG. 1D at new control point 110. None of these edits affect the number of keys in the timeline 108.

Changes to transform channels other than translate X/Y work normally, and are independent of the motion path. This means, for example, that a corkscrew animation could be created by moving an element in a circle in the XY plane via a motion path, and then separately animating z-translation. Similarly, an element that is oriented along a motion path can have an independent animation that spins it along its local X axis.

Figure 1E:
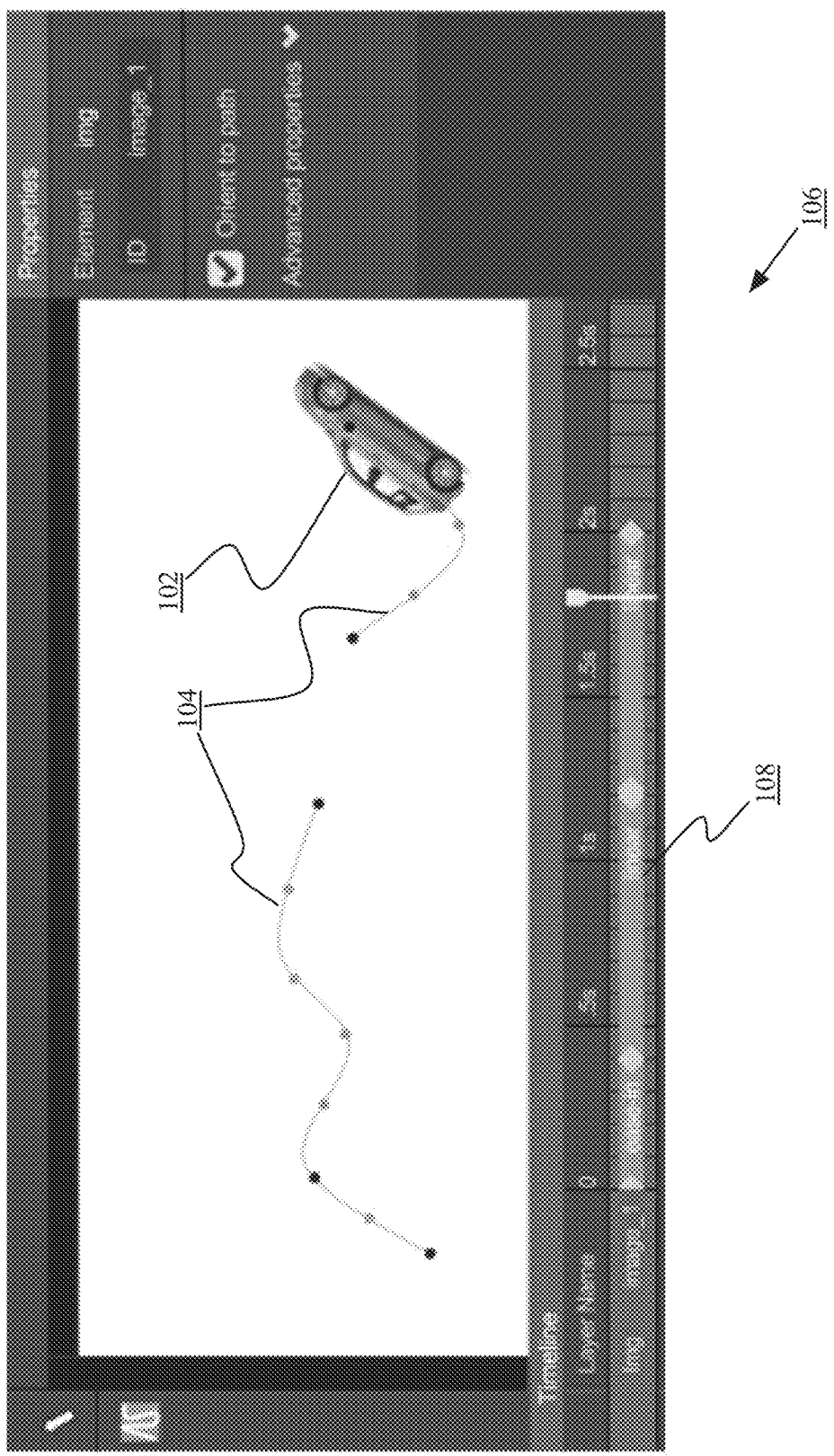
Figure 1F:
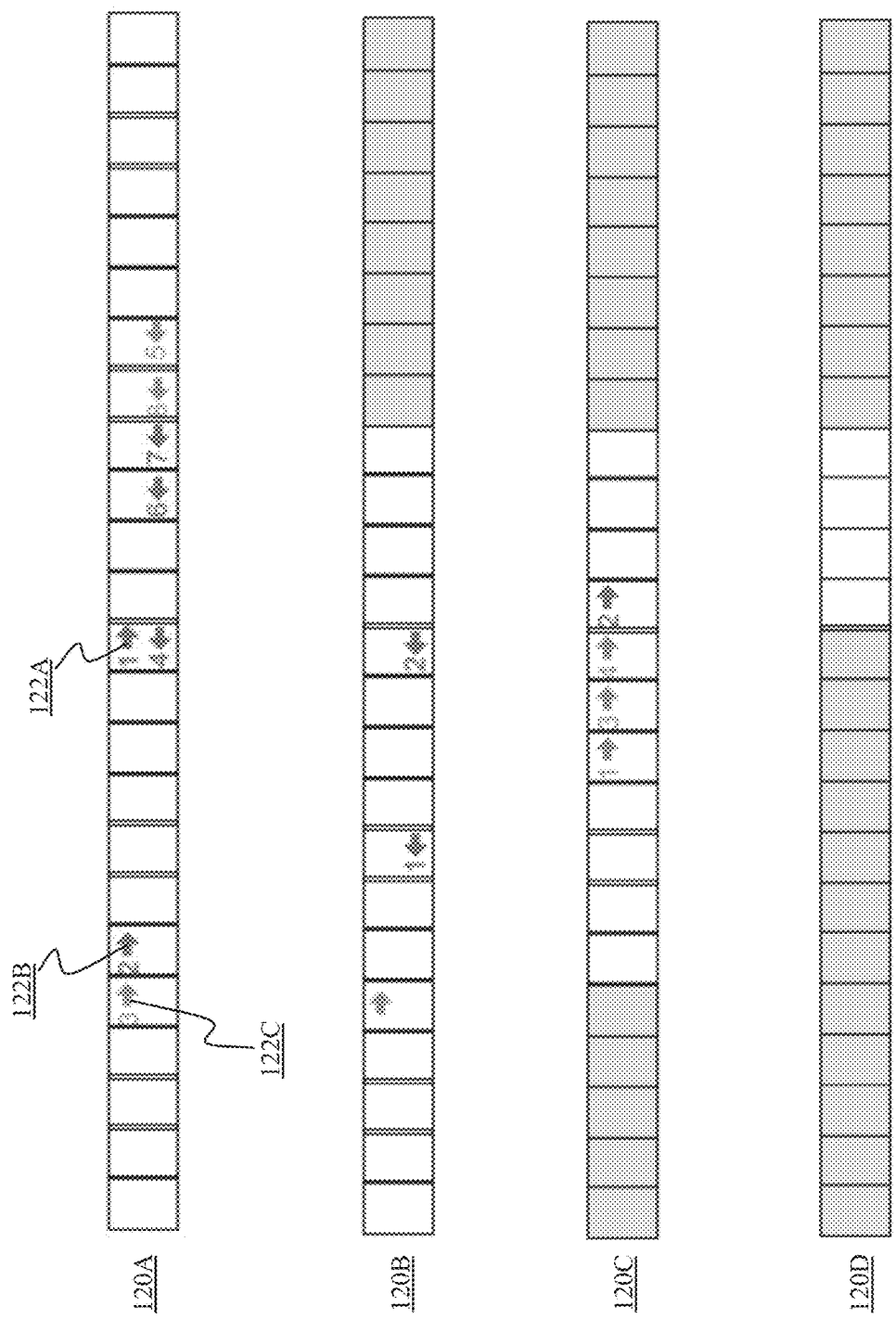
FIG. 1F is an illustration of an implementation of a binary search.
Figure 1G:
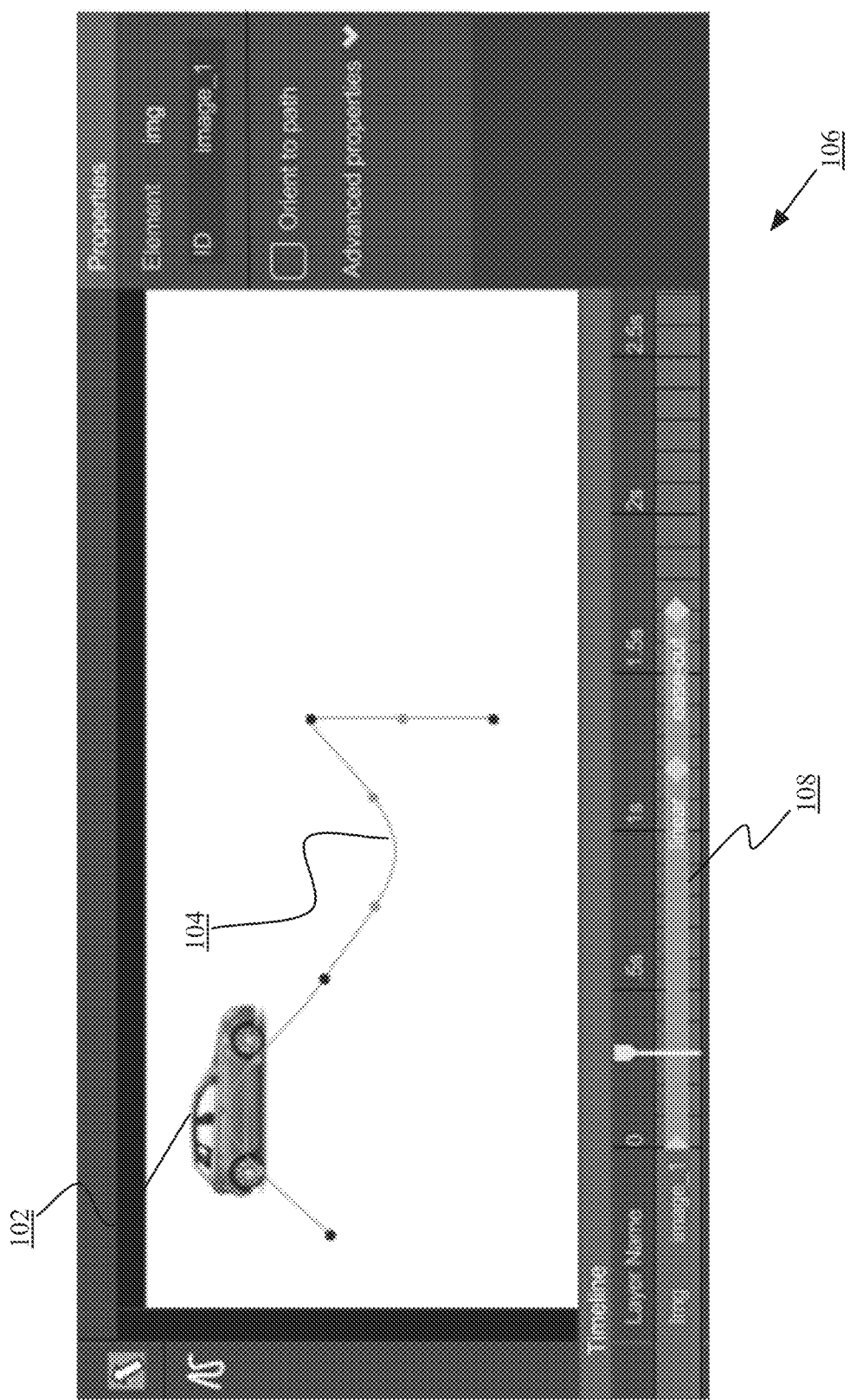
FIG. 1G is another screenshot of an implementation of an animation editor for creating and editing a motion path.

While a single key suffices to create a motion path of arbitrary complexity, only one easing curve can be applied to this path in some implementations. Creating multiple keys allows different sections of a motion path to have different easings; for example, an element might accelerate up for one portion of a path and then travel at a constant speed. Multiple keys can also be used to insert pauses and create discontinuous paths 104, as shown in FIG. 1E, which depicts the user interface 106 if the element 102 is set to accelerate up to the first bend in the motion, then travel at a constant speed, and then jump to a separate section 104 while still travelling at constant speed. The discontinuity is created by adding two keys that both appear close to 1.2 s in the timeline and have different translation values.

Deleting a key deletes the motion path section ending at that key, if there is one. If the next key also has a motion path section, the position of its initial control point is set to the value at the previous key.

In some implementations, motion paths can be created and edited while using the timeline's quick mode. As before, if an element with an animated position is selected, a curve is shown on stage that can either be directly manipulated with the selection tool or edited with the path tool. Similarly, editing the easing between two keys defining a motion path alters the rate of travel along the path, and inserting a key splits the motion path in two without changing its shape.

Motion Paths as CSS Animations

This section define CSS animations and motion paths more precisely, and explains how a motion path is converted to a CSS animation.

A CSS keyframes rule consists of a sequence of keys ($p_i$, $v_i$, $E_i(u)$), where $p_i$ is the key time (represented as a percentage of the total animation duration), $v_i$ is the key value, and $E_i(u)$ is an easing curve that defining how the values $v_i$ and $v_{i+1}$ are interpolated (the final key's easing curve is ignored). Each easing curve E(u) is a 2D cubic Bezier segment $$E(u)=(f(u),w(u)),$$

Where u is the curve parameter, f(u) is the fractional amount of time that has elapsed between the current and next key, and w(u) is the fractional progress toward the next key's value. The first and fourth Bezier control points are always (0, 0) and (1, 1), so the easing curve only has four degrees of freedom. Also, the f values for the second and third control points are required to be between 0 and 1, which ensures that f(u) is strictly increasing, and therefore the inverse function u(f) is well defined. Given keys at (non-normalized) times $t_0$ and $t_1$ with values $v_0$ and $v_1$, at an intermediate time t the value is $$v(t) = v_0 + (v_1 - v_0) \cdot w\left(u\left(\frac{t-t_0}{t_1-t_0}\right)\right)$$

Each keyframes rule is associated with an CSS animation style, which specifies the keyframes rule's name, the total duration of the animation, and the delay before starting the animation. The latter two quantities are used to convert key times from percentages to absolute times in seconds. The animation style rule also provides a default easing curve, which is used if none is defined at a particular keyframe; this may be set to the linear ease.

A motion path's geometry is defined by a 2D cubic Bezier curve G(u)=(x(u), y(u)). The segments of the Bezier curve need not be continuous, nor even connected, although by default GWD produces curves with G' continuity.

Distance along the path is controlled by a function s(t) that maps time to arc length distance. If the path is discontinuous, then gaps between Bezier segments are ignored when determining arc length. In some implementations, s(t) may be constructed by associating sequential segments of the motion path with CSS3 easing functions that interpolate the starting and ending arc lengths. A single easing function may span multiple segments, as long as these segments are parametrically contiguous. This is consistent with existing timeline controls, and in particular, it reduces to the existing GWD behavior when an element is animated along a straight line.

Given s(t), position can be evaluated by constructing a mapping from arc length s to curve parameter u. While this map cannot be exactly represented, a simple approximation is to treat the path as a piecewise linear curve by densely sampling u, and a more efficient approximation can be constructed using Gaussian quadrature.

The element animated along the motion path may be referred to as the path element. The path element's orientation may optionally be made relative to the path, a condition referred to as tangent following. If tangent following is enabled, the element's local x axis is kept aligned to the path tangent. At points where the tangent is not defined (e.g., at a cusp), the limit of the tangent direction is used as the point is approached from lower curve parameters (except at the start, where the system may approach from above). In the extreme case where the path is a single point, the tangent is defined as the x axis.

A motion path's geometry G(u) and distance function s(t) implicitly define the path element's 2D position and, if tangent following is enabled, orientation as functions of time. To represent these trajectories as CSS3 keyframes rules, approximating animation curves X(u), Y(u), and θ(u) that use a similar mathematical representation are fit to the trajectories. Specifically, each animation curve is a sequence of 2D cubic Bezier segments (t(u), v(u)) that are equivalent to CSS easing curves, in the sense that 1) t(u) is strictly increasing, so the inverse u(t) is well-defined, and 2) values are computed as v(t)=v(u(t)). As with CSS easing curves, the first condition is enforced by requiring $t_0 \le t_1 \le t_3$ and $t_0 \le t_2 \le t_3$.

Once suitable animation curves have been calculated. All degrees of freedom set by a motion path are represented using CSS transforms: i.e., X(u) is transformed into CSS rules, and the other channels are handled similarly. Let the N Bezier segments of X(u) be $(X_0(u), \ldots X_{N-1}(u))$, and let $(t_{i,0}, v_{i,0}) \ldots (t_{i,3}, v_{i,3})$ be $X_i$'s control points. The animation style specifies a delay of $t_{i,0}$, a duration of $t_{i,3}$, and a linear default easing function. In the keyframes rule, the time and value for $X_i$ are $$\left(\frac{t_{i,0}}{t_{N-1,3} - t_{0,0}} \cdot 100\%, v_{i,0}\right).$$

A key at time 100% is added with value $v_{N-1,3}$ and no specified easing function. Values are written using an appropriate CSS transform string (e.g., transform3d(v, 0, 0) for an x-translation by v). Finally, $X_i$'s easing function is defined by normalizing the second and third control points:

$$\left(\frac{t_{i,1} - t_{i,0}}{t_{i,3} - t_{i,0}}, \frac{v_{i,1} - v_{i,0}}{v_{i,3} - v_{i,0}}\right) \text{ and } \left(\frac{t_{i,2} - t_{i,0}}{t_{i,3} - t_{i,0}}, \frac{v_{i,2} - v_{i,0}}{v_{i,3} - v_{i,0}}\right).$$

One technical difficulty is that an easing curve cannot be created if an animation segment starts and ends with the same value (unless the animated value is constant, in which case any ease suffices). In this case, the animation segment is split into two sub-segments at the point where the animated value attains the largest absolute difference from the endpoints, which will be one of solutions to the quadratic equation formed by setting the derivative of $v_i(u)$ to 0.

Optimizing Animation Curves

As in the previous section, and without loss of generality, the following discussion is limited to x-translation, but may be applied to other translations as discussed above. An animation curve $X(u)$ is fit to n samples of the motion path trajectory $(t_i, x_i)$ (taken, say, at 30 Hz), and a list of control points C determined that limits the error of the approximation. The term "limit" is used instead of "minimize" because an arbitrarily accurate (but space-inefficient) approximation can always be created by adding many control points; in particular, a piecewise linear curve can be created with a control point at each sample. Instead, the goal of the system is to create an animation that is visually indistinguishable from the true motion path, and that has as compact an HTML5 representation as possible. The fidelity of the animation is controlled by requiring the animation curve to be within an absolute tolerance E from each sample. More precisely, if the error of the $i^{th}$ sample is $$E_i = x_i - v_X(u_X(t_i, C), C),$$

then $|E_i| \le \epsilon$, or equivalently, $$\|E\|_\infty \le \epsilon.$$

This is a minimax objective function, which is common in curve fitting. The dependence of $u_X(t)$ and $v_X(t)$ on C is explicitly denoted. According to tests, $\epsilon = 0.25$ (in units of pixels) reliably produces accurate results, and in most cases even significantly larger values ($\epsilon = 1$) produce acceptable approximations.

An individual Bezier segment on an animation curve can either be written as a generic cubic segment

```
t% {
    transform: transform3d(x, 0, 0);
    animation-timing-function: cubic-bezier(c1, c2, c3, c4);
},
```
or as a linear segment
```
t% {
    transform: transform3d(x, 0, 0);
}.
```

Other timing functions are also possible (e.g., ease-in), but they are not realistic output of a numerical optimization. The system seeks to optimize the post-compression footprint of the animation curve, which means that oft-repeated strings like "transform: transform3d" and "animation-timing-function: cubic-bezier" are essentially free. Instead, the primary sources of entropy are the numerical quantities: the key time, the key value, and the easing curve parameters (for cubic segments). If numbers are written using s bytes, then a single cubic segment costs approximately 6s bytes, and a single linear key costs 2s bytes. Similarly, a keyframes rule with n cubic segments costs roughly 6sn bytes. To be concrete, below are empirical measurements of the keyframes rule size on disk, as a function of the total number of animation curve segments.

Estimated and actual keyframes rule sizes for motion paths with different numbers of animation segments are shown below. All numbers are written using 7 characters (six digits plus a decimal point):

| # Segments | Uncompressed size | Actual compressed size | Estimated compressed size |
| --- | --- | --- | --- |
| 6 | 994 B | 346 B | 252 B |
| 12 | 1966 B | 523 B | 504 B |
| 18 | 2824 B | 745 B | 756 B |

The estimate becomes more accurate as the number of segments increases, and even becomes slightly worse than reality as the compression routines discover regularities in the numbers themselves (for example, the two-character sequence "0." appears often in easing curves).

If an animation curve's duration is sufficiently short that there are four or fewer samples, then it can always be fit exactly with either a single cubic segment or a sequence of linear segments. The latter may be utilized in some implementations, since it is at least as space efficient (and more efficient if there are only two or three samples), and it avoids the risk of overshoot. In some implementations:

1. The system fits a single linear segment to all samples, and returns it if it's within tolerance;
2. Otherwise, the system fits a single cubic segment, and returns it if it's within tolerance; and
3. If both (1) and (2) fail, the system subdivides the samples and fits animation curves to each subset.

Segment boundaries are required to coincide with the first and last sample in some implementations, which guarantees that the final animation curve is continuous, and also guarantees that keyed configurations (which are always at the boundaries of the curve) are matched exactly.

A prototype of this algorithm was implemented and tested on motion paths whose geometry consisted of a single Bezier segment and whose timing function was a single CSS3 easing curve. Most motion paths required an animation curve with 3-5 segments, although the number can go as high as 7 (or as low as 1). When subdividing a sample set, in some implementations, two equally-sized subsets were created. In other implementations, a larger portion of the samples may be fit within a single segment, improving efficiency; in tests, the savings is usually 2-4 segments. The system greedily selects the subdivision point that results in the largest possible subset being fit with a single segment. Assuming that an unsuccessful fit can never be made successful by adding samples, this can be done via binary search, as shown in steps 120A-120D of FIG. 1F. The boxes represent the array of samples, and a grayed-out box indicates a sample that has already been fit with a segment. In the first row 120A, binary search is performed both from the left and right to find split points 122A-122C; shading indicates whether a single segment could be fit, and numbers indicates the order in which samples are tested. The optimal sample from the side that was not used is remembered during the next iteration. Sample sets of size four or smaller can always be fit exactly.

This algorithm is more computationally expensive than simply dividing the samples in half, since a separate optimization is performed at every step of the search. In the worst case, where only a few samples can be fit by any one segment, the algorithm requires O(n·lg(n)) optimizations, versus O(n) if the sample set is always halved. In practice, however, this worst case is never reached, because the underlying samples are from a relatively smooth trajectory, and therefore at some point increasing n no longer yields an increase in the complexity of the final segment sequence.

To fit a cubic Bezier animation curve segment to a set of n samples, in some implementations, the samples are normalized so each dimension ranges from 0 to 1, and a curve-fitting algorithm is used that minimizes the sum of squared errors between the samples and corresponding points on the segments. While this objective function is not the original one discussed above (least-squares versus minimax), it yields acceptable results in practice; the true objective function may still be used to decide if subdivision is necessary. If the u-value at each of the samples is known, then a least-squares approximation reduces to a linear system of equations. Given an existing curve, the system can then improve the estimated sample u's and iterate:

1. Treat the sample as a piecewise linear curve, let $s_i$ be the arc length of the $i^{th}$ sample, and initially assign $u_i = s_i/s_{n-1}$.
2. Compute Bezier control point values that interpolate the first and last sample, and otherwise minimize squared error. This can be done efficiently, as it is the least-squares solution to a linear equation Ac=v, where A is an n×2 matrix.
3. For each sample, update $u_i$ by finding the value of u at the closest point on the curve. This is done using Newton-Raphson iteration to find the point where the tangent and the vector to the sample are perpendicular.
4. Repeat (2) and (3).

Since the optimization is unconstrained, the output time control points $(t_1, t_2, t_3, t_4)$ are clamped if necessary to ensure $t_1 \leq t_2$, $t_3 \leq t_4$.

One motivation for using this particular curve-fitting algorithm is that it's relative fast and easy to implement. In some implementations, a more general-purpose optimizer may be used, using the existing algorithm to obtain initial control point values. However, exact derivatives may be impractical to obtain with a general optimizer, because computing the curve parameter u as a function of time t and control points $c_1, \ldots, c_4$ entails evaluating the roots of a cubic polynomial.

In some implementations, the system may be written in javascript, while in other implementations, other languages such as C++ may be utilized for speed and to make it easier to find usable pre-existing numerical optimization libraries.

In some implementations, instead of generating keyframes rules at authoring time, the system may store an encoding of the motion path definition (geometry control points, timing functions, error tolerance), and generate the keyframes rules via a script when the document is loaded by the end user. Since the encoding is far more compact than the generated rules, and since the runtime script is a fixed size, for a sufficiently complex set of motion paths this will always be a more compact representation. The complexity needed to realize a size savings, however, is likely to be fairly high. Even if the system forgoes optimization and simply generates a dense set of linear segments, the script must still contain an implementation of Bezier curves, including evaluating values and tangents and constructing an arc-length parameterization; it must construct the piecewise linear approximation of the motion path and convert this to CSS; and it must support features like media rules and timeline pauses/labels. Conservatively, it's compressed footprint would be at least a few KB. Based on the measured size of keyframes rules presented earlier in this section, and experiments on the typical number of CSS animation segments needed to fit a motion path segment, a document would probably need to have 20-30 motion path segments before any space savings are realized, and documents with only a couple of simple paths would incur an unnecessary expense. There may, in some implementations, be a load-time delay as motion path animation is constructed.

Because the underlying path geometry is itself a cubic Bezier curve, it is possible to compute an approximate animation that exactly follows the geometry, and only incurs timing errors. Given geometry $G(u)=(x(u), y(u))$, the system can compute samples $(u_i, t_i)$ that, based on the timing curve, give the values of u that should be attained at various times, and then find an cubic Bezier curve t(u) that approximates these samples. The resulting x-translation and y-translation curves would then be $X(u)=(x(u), t(u))$ and $Y(u)=(y(u), t(u))$. Time errors may be less noticeable than positional errors in some implementations, while in other implementations, a fairly small error tolerance (3 ms) may be needed to avoid visible errors, and overall more segments needed to get an acceptable approximation.

In some implementations, CSS3 may allow motion path animation to be defined as follows:

1. Path geometry is set in CSS through the motion-path property, which can either be a CSS basic-shape or a string defining an SVG curve.
2. Position along the path is set through motion-offset, which can be measured either in pixels or as a percentage of the total arc length. Animating this value moves an element along the path.
3. Elements are always oriented to the path, and a constant offset may be applied to this orientation.

If motion paths are assumed have cubic Bezier path geometry, and if arc-length distance may be animated using CSS3 easing functions, then in many implementations, the motion path representation discussed above may be converted into a native CSS3 representation, should browser support become more widespread.

Representing Motion Paths

Motion paths have a nontrivial HTML5 representation that differs at run time and at author time. A run time structure for motion paths is described below, and then how motion paths are serialized to disk (and, equivalently, how they appear in code view) is discussed.

The CSS animation model considers a transform to be a single property, even though in general it is defined by multiple parameters. If two keys use the same sequence of primitive functions (translate3d, rotateZ, etc.), then the arguments to these functions are each interpolated by the first key's easing curve. While multiple animations may apply to an element, only one may define values for a particular property, and therefore the only way to independently animate different transform channels—that is, to use different numbers of keys and/or different easing curves—is to create multiple elements in a hierarchy, each associated with a separate transform animation. There are two reasons why this must be done when using a motion path:
1. Transform channels that are not governed by the motion path, such as scaling and out-of-plane rotation, must be separately animatable.
2. Individual motion path channels generally have independently constructed animation curves.

To illustrate, below is an example DOM for a published document containing a motion path without tangent following:

```
<head>
  <style>
    .anim-class {
      animation: my-keys 1s linear 0s;
    }
    @keyframes my-keys { ... }
    .anim-class-gwdmp-x {
      animation: my-keys-gwdmp-x 1s linear 0s;
    }
    @keyframes my-keys-gwdmp-x { ... }
    .anim-class-gwdmp-y {
      animation: my__keys-gwdmp-y 1s linear 0s;
    }
    @keyframes my-keys-gwdmp-y { ... }
  </style>
</head>
<body>
  <div data-gwd-motion-path-node="x" class="anim-class-gwdmp-x">
    <div data-gwd-motion-path-node="y" class="anim-class-gwdmp-y">
      <div id="myElement" class="anim-class"> </div>
    </div>
  </div>
</body>
```

If tangent following were enabled, z-rotation would also be animated by the path, and therefore there would be a third intermediate node and the associated animation rules.

A naming convention is used to associate motion path animations with the animations applied to other element properties. For each animated element, GWD identifies an animation class, which is used in the selector for the dominant rule of the element's animation style (the animation rule). In some implementations, a motion path's path element may have an animation class and animation rule, even if it has no animated properties (and therefore either no keyframes rule, or an empty keyframes rule). As depicted above, each intermediate node is assigned an animation class formed by appending a channel-dependent suffix to the element's animation class. Similarly, the keyframes rule at each intermediate node is named by appending the same suffix to the name of the element's keyframes rule.

The intermediate nodes may be added as parents to ensure that the total effective transform is always representable using GWD's canonical sequence of transform functions:
translate3d rotateZ rotateY rotateX scale3d
If the extra nodes were instead added as children, then animating scale while tangent following is enabled would end up shearing the element.

Motion paths may be defined differently in the base CSS rules and in media rules, and the variants may animate different transform channels. For example, a motion path may be defined in a media rule but not in the base rules, or it may have tangent following disabled in the base rules and enabled in a media rule. Any intermediate node needed by at least one motion path variant is added to the DOM, and if a transform channel is not used by the active motion path, then it will have an empty keyframes rule.

Each intermediate node has absolute positioning and a transform-style of preserve-3d, which can be enforced via a single style rule with selector [data-gwd-motion-path-node]. The intermediate nodes are also styled such that the following holds:
1. If the path element's width or height is defined as a percentage, then it's computed size is based on its logical parent, ignoring the intermediate nodes.
2. If tangent following is enabled, the node hosting the z-rotation's animation has a transform origin coincident with the center of the path element. This ensures that when the element is rotated, its center stays on the path.

To satisfy (1), the global style rule for intermediate nodes sets width and height to 100%. To handle (2), when tangent following is active, the top-level intermediate node may be assigned the left, top, width, and height values intended for the path element, overriding the default width and height values. The path element may also be assigned a left/top of 0px and a width/height to 100% (and the same is already true of the other intermediate nodes). The path element can be updated by setting inline styles, but the intermediate node's styles must be added to the style sheet, since they can vary with the active media rule:

```
<head>
  <style>
    #myElement {
      left: 50%;
      width: 150px;
      color: red;
    }
    [data-gwd-motion-path-node].gwd-motion-path-abcd {
      left: 50%;
      width: 150px;
    }
    ...
    @media (max-width: 199px) { }
    @media (min-width: 200px) {
      #myElement {
        width: 250px;
        color: blue;
      }
      [data-gwd-motion-path-node].gwd-motion-path-abcd {
        width: 250px;
      }
    }
  </style>
</head>
<body>
  <div data-gwd-motion-path-node="x"
       class="anim-class-gwdmp-x gwd-motion-path-abcd">
    <div data-gwd-motion-path-node="y" class="anim-class-gwdmp-y">
      <div data-gwd-motion-path-node="theta" class="anim-class-gwdmp-theta">
        <div id="myElement" class="anim-class"
             style="left:0px; top:0px; width: 100%; height: 100%"></div>
      </div>
    </div>
  </div>
</body>
```

These extra rules may be utilized in some implementations if tangent following is enabled. Note that it is not possible to directly set the transform origin of the intermediate node, because the desired location may be a mixture of absolute and percent-based styles, as in the example above.

Since there are many code paths that result in left/top/width/height styles being set, and since these rules are not authored by the user, these may be constructed during serialization:
1. All existing rules needed for tangent following are removed. They are easily identified, because their selectors contain the clause [data-gwd-motion-path-node].
2. For each motion path in the document, the dominant left, top, width, and height styles (if any) are retrieved for each scope.
3. A unique CSS class of the form gwd-motion-path-abcd is added to the top-level intermediate node. To minimize churn between saves, this class is generated when the motion path is first created and re-used.
4. For each scope where at least one style is set, a style rule is added with a selector of the form [data-gwd-motion-path-node].gwd-motion-path-abcd { ... }

A limitation of this approach is that edits in code view are always saved without modification, so changes to the path element's left/top/width/height styles will not propagate to the intermediate node's styles until the next time the document is serialized from design view. If the document is published from code view, then the intermediate node styles may be rebuilt, although this code path only has access to the raw DOM, and therefore is unable to leverage the DocumentStyleModel API.

Lastly, if the path element's width and/or height are animated, then its center will not stay attached to the path. The system does not attempt to correct this, because 1) scale animation is preferred to width/height animation, and is used by default when size is animated, and 2) adjusting scale keeps the element centered, as long as its transform origin hasn't been edited.

Each motion path generates multiple keyframes rules, and these rules are often complicated, since each motion path segment usually requires multiple keys for an acceptable approximation. As the output of a numerical optimization, users are unlikely to find it useful to inspect these rules. Moreover, motion paths are associated with multiple style rules that are essentially implementation details—namely, the rules that host animation styles and mirror the path element's left/top/width/height styles. To avoid cluttering code view, in the source document all CSS generated for motion paths is stored in a separate style sheet. When the document is loaded into the system's design view, the contents of this style sheet are transferred to the default style sheet, so normal editing logic functions correctly. If rules are contained in a media rule whose media query is not present in the default style sheet (because the user edited the media queries manually), a warning is displayed, and the rules are left in the motion path style sheet. When the document is re-serialized as part of entering code view or saving to disk, all motion path animations are identified and transferred back to the motion path style sheet, along with their parent media rules if necessary. This is not done, however, when the document is serialized at publish time; instead, all rules are left in the main style sheet, and the motion path style sheet is removed.

The intermediate nodes needed to support motion path animation also add clutter to the document, and they may be confusing to a user. In light of this, these nodes are removed when the document is stored on disk or displayed in code view. Similarly, the inlined left/top/width/height styles needed to support tangent following are not added to the path element. To simplify the publish process, the information needed to reconstruct the intermediate nodes is stored in the authoring document as custom attributes on the path elements. One attribute declares the path element's animation class, and the other declares the class name used by the rule for the intermediate node's left/top/width/height styles.

```
<div id="myElement" class="anim-class"
    data-gwd-motion-path-anim-class="anim-class"
    data-gwd-motion-path-layout-class="gwd-motion-path-abcd">
</div>
```

These attributes are removed at publish time. Since every motion path has an animation class, data-gwd-motion-path-anim-class can also be used to identify all path elements in a document.

To support loading a document into a browser directly from the file system, the same logic used to restore intermediate nodes at publish time is invoked from a script tag. This script tag may be removed when the document is published.

The animation rules generated for a motion path do not fully capture the original author-time specification, which includes the path control point values, the list of control points that correspond to keys, the times and easing values associated with those keys, whether tangent following is enabled, and parameters used to tune the optimization process. Since these properties are linked to the generated CSS animation rules, and therefore may vary within media rules, the system may store them as JSON within CSS custom variables in the animation rules associated with motion paths. There are always at least two such rules, one for x-translation and one for y-translation, so the system may arbitrarily add the custom variables to the x-translation animation rule. To illustrate, consider the motion path 104 of FIG. 1G. As shown, there are three Bezier segments and three keys, including the key at time 0. The first two segments are grouped between the first two keyframes, and they use the default linear easing. The third segment is between the second and third keyframes, and is a straight line with ease-out timing. Tangent following is enabled. An example HTML5 representation of the motion path definition is as follows:

```
<head>
  <style>
    .anim-class-gwdmp-x {
      animation: my-keys-gwdmp-x 1s linear 0s;
      --gwd-motion-path: {
        "tangentFollowing": true,
        "sections": [{
          "controlPoints": [100, 100, 200, 200, 400, 200, 500,
                            100, 500, 100, 600, 0, 800, 0, 900,
100],
          "timeInterval": [0, 1200]
        }, {
          "controlPoints": [900, 100, 900, 100, 900, 300, 900,
300],
          "timeInterval": [1200, 1600],
          "easing": "ease-out"
        }
      ]};
      }
      ...
  </style>
</head>
<body>
  <div id="myElement" class="anim-class"
      data-gwd-motion-path-anim-class="anim-class"
      data-gwd-motion-path-layout-class="gwd-motion-path-abcd">
  </div>
</body>
```

Here times are in milliseconds and control point coordinates are listed in the order [X1, Y1, X2, Y2, ... ]. In some implementations, this data may be manually edited, while in other implementations, the data may be locked or prevented from editing or otherwise inaccessible.

CSS custom variables are not supported in all major browsers. As an alternative, motion path authoring state may be stored in the document body as a JSON block in a child script tag of the path element. The media rules may be identified in the JSON through

```
their media queries:
<div id="myElement" class="anim-class">
  <script type="text/javascript" gwd-motion-path>
    {[
      {
        sections: [
          {
            controlPoints: [100, 100, 200, 200, 400, 200, 500, 100],
            timeInterval: [0, 1200],
          }
        ]
      },
      {
        mediaQueries: ["(min-width: 500px)"]
        sections: [
          {
            controlPoints: [100, 100, 200, 200, 400, 200, 500, 100],
            timeInterval: [0, 1200],
          }
        ]
      },
    ]}
  </script>
</div>
```

If an edit is made to the set of breakpoints, the media queries encoded in every motion path's authoring state would need to be updated, which either entails solving a delicate inference problem (given a motion path for a media query that is not present in the document, find the existing query that should be substituted in), or adding motion-path-specific logic to each way that the set of breakpoints may be edited (editing/inserting/deleting one or more width/height/orientation breakpoints).

At load time, an in-memory motion path representation is constructed from the authoring data discussed in Section 4.2., and an internal API is used to retrieve the motion path model for a given element. When a timeline layer is constructed for an element, its motion path keys are merged with the elements transform keys, so there is still a single transform track.

The intermediate nodes used at run time are essentially rendering constructs, and they are not intended to be viewed or manipulated by the user. Indeed, adding them to the author time DOM would complicate several basic editing scenarios:

Element selection would no longer involve looking strictly at the current editing container's children. Instead, if a child is a motion path's intermediate node, its descendants must be traversed until the path element is found. At the same time, intermediate nodes should be considered part of the top-level selection when copy/pasting, grouping, or wrapping elements (and possibly other cases as well).

When computing an element's complete local transform, it would no longer be sufficient to inspect just that element's styles.

If tangent following is enabled, changes to the path element's left, top, width, and height styles would have to instead be applied to the top-level intermediate node.

On the other hand, the only thing sacrificed by not constructing the run time motion path DOM is that animation playback and timeline scrubbing no longer work as-is. Since this is a more tractable problem, intermediate nodes are left out at author time, and instead adjustments made to animation preview.

To play back a motion path (in response to the timeline's play button being pressed), the run time DOM is first restored by the same API used when preparing the document for publish. When playback is stopped, the DOM is reverted back to its author time state.

Timeline scrubbing is implemented by computing animated property values at the current time using the Element.animate API and then applying these values as override styles. To support scrubbing motion paths, the system may also compute the animated values at the current time for each intermediate node (which does not require re-adding them to the DOM), and the override transform style is then found by combining the path element's own transform with those of the intermediate nodes. While the motion path transform is always relative to the element center, the element's transform can have an arbitrary center, and the final transform must be relative to this. Let $M_E$ and $M_P$ be the transformation matrices for, respectively, the element and the motion path, and let $T_E$ and $T_P$ be the translation matrices shifting the element origin to the transform origin. Then the total transformation matrix at the element is $$T_E M_E T_E^{-1} T_P M_P T_P^{-1}.$$

Writing the difference between the transform origins as $T_\Delta = T_P^{-1} T_E$, the matrix relative to the transform origin $T_P$ is $$T_\Delta M_E T_\Delta^{-1} M_P$$

Working with Motion Paths

If a single element is selected, and if its position is animated (with or without a motion path), then the curve it follows is shown on stage. Creating an animation using the standard workflow, possibly by adding a single position keyframe, always results in a piecewise linear curve, which is not considered a motion path. However, the same tools used to edit the geometry of an existing motion path can also be used to create a new motion path, by bending the segment between two position keys into a nonlinear shape, as discussed above.

When a motion path is created, all animation of the element's 2D position is subsequently interpreted as a motion path, including segments whose shapes have not been altered and are therefore straight lines. Existing z-rotation animation, however, is considered to be on top of the motion path; it is preserved when the path is created, and it remains (and can be freely edited) regardless of whether tangent following is enabled or disabled. As part of creating a motion path, the usual tag encoding its authoring state is added to the DOM, and therefore the presence of a motion path can always be detected by inspecting the DOM. Similarly, all edits to a motion path are immediately reflected in the DOM encoding. A motion path can be reverted to an ordinary position animation either by directly manipulating its geometry to be sufficiently close to a piecewise linear curve, or by deleting the motion path property from each key in the timeline.

For practical reasons, in some implementations, motion paths exclusively use x- and y-translation, rather than left/top:

Transform animation is strongly encouraged over left/top animation, because it is more performant, and because left/top animation can have a jagged appearance due to the browser rounding values to integers at render time.

Supporting both left/top and translation may complicate the implementation, since the system has to distinguish between the two cases whenever styles are set or accessed (which is quite often), and a left/top motion path and a translation motion path may simultaneously exist for a single element. Users must also be notified of two distinct types of motion path.

Thus, in these implementations, left/top animation is ignored by the motion path UI. If an element exclusively has left/top animation, then the (piecewise linear) curve followed by the element is not shown in the UI. If an element has both left/top and translation animation, then only the curve induced by the latter is drawn, the element will not be centered on this curve. Finally, if the selection tool is being used in strict left/top mode, then motion path handles are not shown.

Figure 1H:
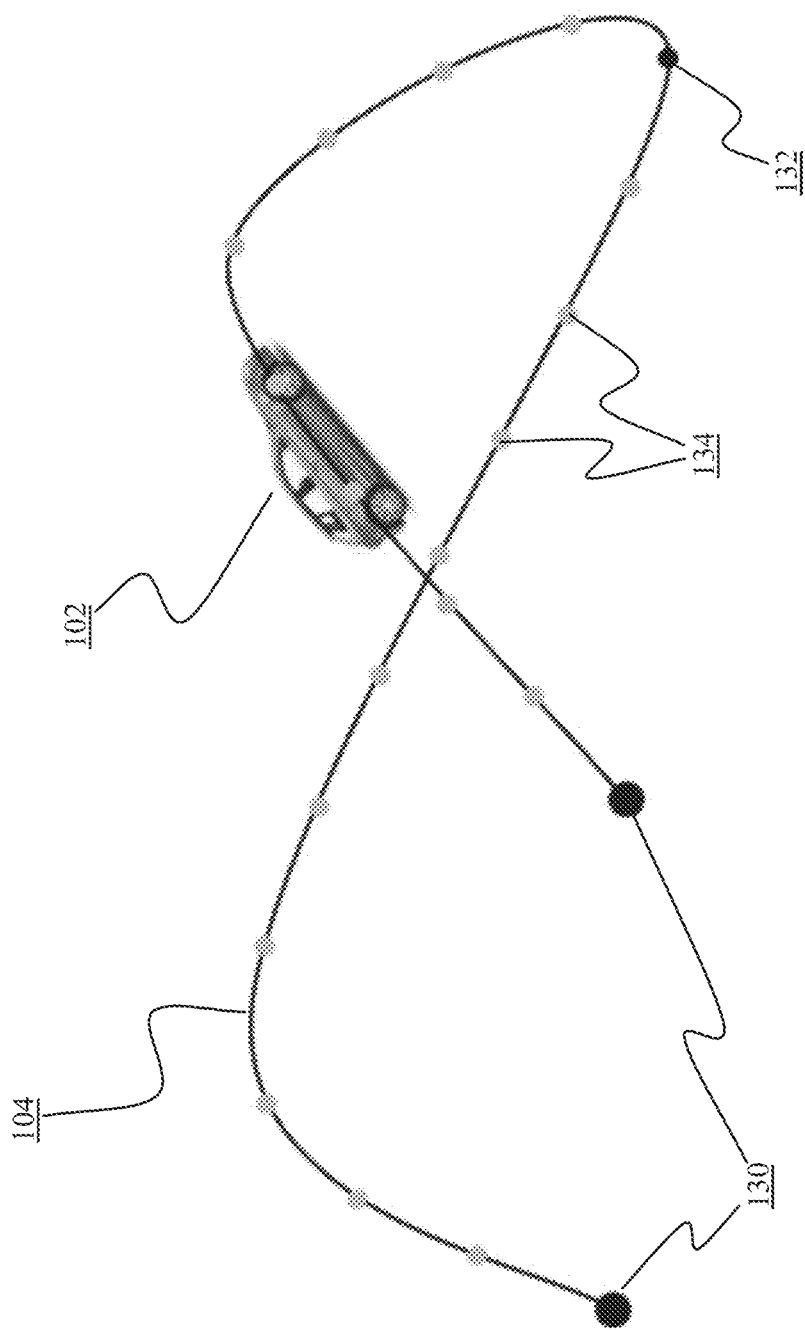
FIGS. 1H-1K is a diagram of an example implementation of editing motion paths.

The curve followed by an animated element is always a sequence of Bezier segments, which may simply be straight lines. If the selection tool is active when a single animated element is selected, handles are placed at the start and end of each segment, and additional handles are added by sampling the curve at regularly spaced arc length intervals. The spacing is chosen such that there are at most n samples spaced at least w pixels apart. An example rendering is shown in FIG. 1H. There are three kinds of handles, each depicted in a different size and/or color: the small gray circles 134 are sampled positions, the small black circle 132 is a control point, and the large black circles 130 are keyframes (which are also necessarily control points).

Dragging a handle with the mouse updates the shape of its curve segment such that the curve passes exactly through the handle without disturbing its endpoints (unless the endpoint itself is being moved). If there is an adjacent curve segment, and if its tangent is (approximately) continuous at the junction, then it is adjusted so this continuity is preserved. Thus, moving a single handle requires keyframes rules to be recomputed for up to two segments.

To keep dragging smooth, the motion path model's state is altered to indicate that editing is in progress, and when the timeline computes animated values at the current time, it asks the motion path to derive exact values directly from the control points and the timing function. While this still requires the arc-length parameterization to be regenerated at every step, it is much faster than having to repeatedly generate optimized keyframes rules. When the mouse is released, the keyframes rules are rebuilt, which may result in a slight shift if the element's position, depending on the approximation tolerance and the current time (since positions are always exact at key times). Also upon mouse release, the timeline is notified that the motion path animation has changed, so it can update label animations and other state.

The selection tool provides a simple editing interface, but if more complete control is needed over the underlying Bezier representation of a motion path, a path tool can be used instead. The path tool provides a graphical interface that is nearly identical to the pen tool:

Control points can be moved by clicking and dragging them.

If a tangent control is moved, the opposite tangent control is forced to be collinear (preserving G' continuity), unless a modifier key is held.

Double-clicking a control point collapses its tangents to the same point, creating a corner. If the tangents have already been collapsed, they are extended so they can be further manipulated (but the corner's shape is maintained).

Existing control points can be deleted. If the control point is also a key, that key is deleted, and to be consistent with existing timeline behavior, the timing function from the previous key is extended to the next key.

New control points can be inserted at any point in the path. When this is done, the path's overall shape is not altered, and a new key is not inserted, so the timing function is not changed, and the timeline span at the current time encompasses multiple segments.

Figure 1I:
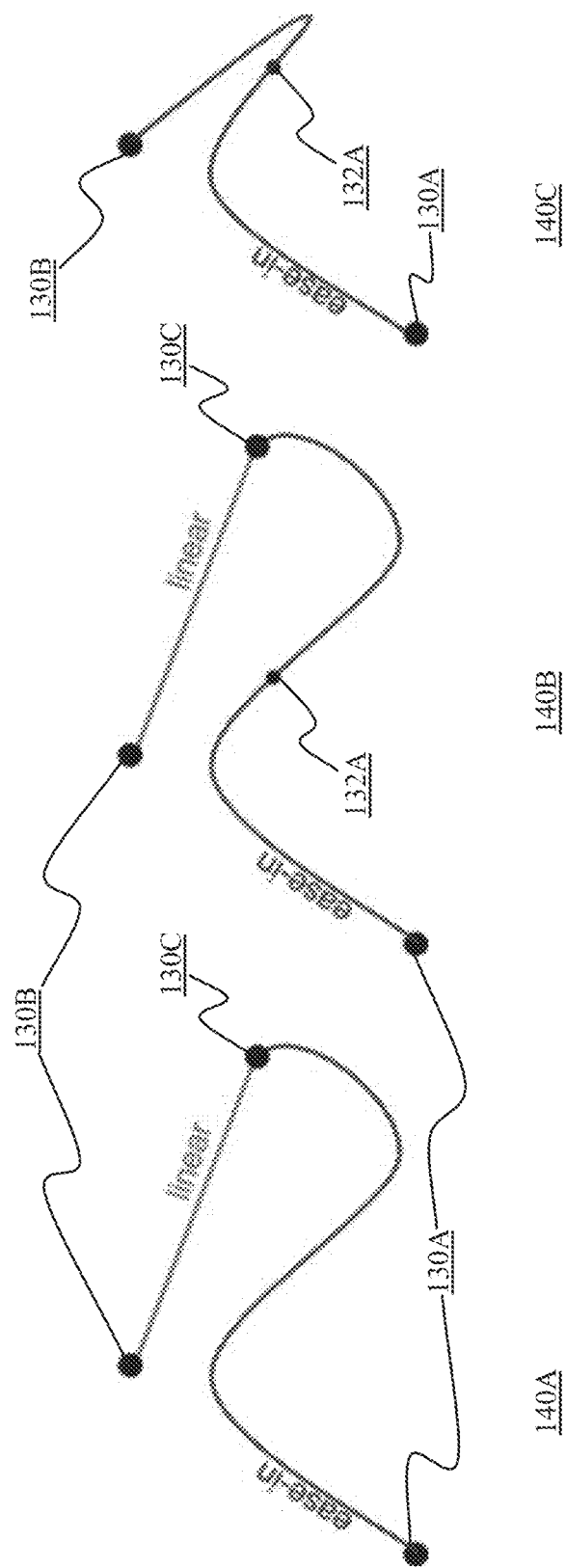

To illustrate control point insertion and deletion, examples of the effects of adding one control point and then deleting another are illustrated in FIG. 1I. As before, larger control points correspond to keys. As shown in FIG. 1I at left 140A, a motion path may have two segments (e.g. an ease-in segment between control points 130A and 130C; and a linear segment between 130C and 130B). A control point 132A may be inserted in the middle of the ease-in segment, as shown at middle in 140B. The animation is unchanged. As shown at the right in 140C, deletion of control point 130C causes the animation to be recomputed, leaving a single ease-in segment.

Figure 1J:
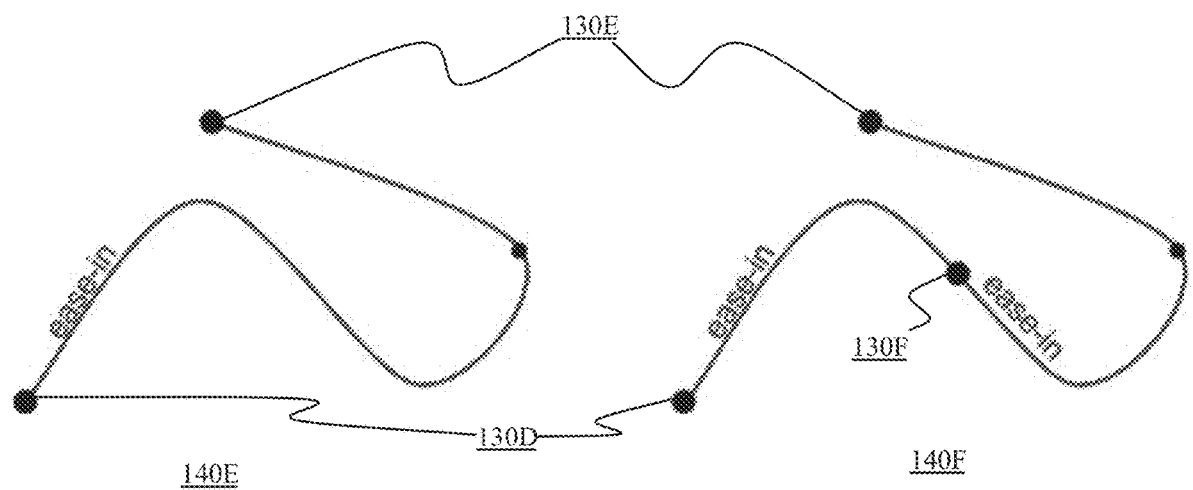

Using the path tool, in some implementations, it is not possible to append a new control point to the end of a path; this must be done by setting a new key via the timeline. As with the selection tool, in some implementations, new keyframes rules are not generated while the mouse is being dragged The timeline of the user interface can also be used to insert keys into a motion path, just like any other animation. If the new key is set after the last existing key, a control point is appended to the motion path's geometry at the same location as the final control point, and the (degenerate) new segment is assigned a linear timing function. Analogous behavior occurs if the new key is before the first existing key. If the key is instead inserted between two existing keys 130D-130E, as shown in FIG. 1J, then a control point (e.g. 130F) is inserted into the motion path such that its shape is not changed. To be consistent with existing timeline behavior, the timing function used for the original segment is re-applied to the new subsegment. For example, if the original path section had ease-in timing, after inserting a new key the element will suddenly decelerate at the key time and then speed back up.

New motion path keys can also be created, and existing keys can be edited, simply by setting a path element's position. Unlike other mechanisms for editing motion paths, multiple motion paths may be edited at once, since multiple path elements may be selected. Instead of adding motion-path-specific handling to every code path that sets 2D position (e.g., the selection tool, the translate tool, and the PI), the system may interpret a change to an element's transform as a motion path edit if the only affected channels are x- and/or y-translation. Specifically, say the timeline receives a notification that an element's transform has been updated from $M_O$ to $M_N$, the element has a motion path, and the transform change $M_N/M_O^{-1}$ is a pure 2D translation. This results in the motion path position at that time being moved by $M_N/M_O^{-1}$, inserting a new key if one does not already exist. In some implementations, keyframes rules are reoptimized only when the mouse is released. Edits to an element's transform that affect channels other than x- and y-translation are not handled specially, and simply result in an update to the element's own animation. This enables users to perform rotations and scales about points other than the transform origin without affecting the motion path. As a consequence, x- and y-translation can be animated both by a motion path and at the path element.

Figure 1K:
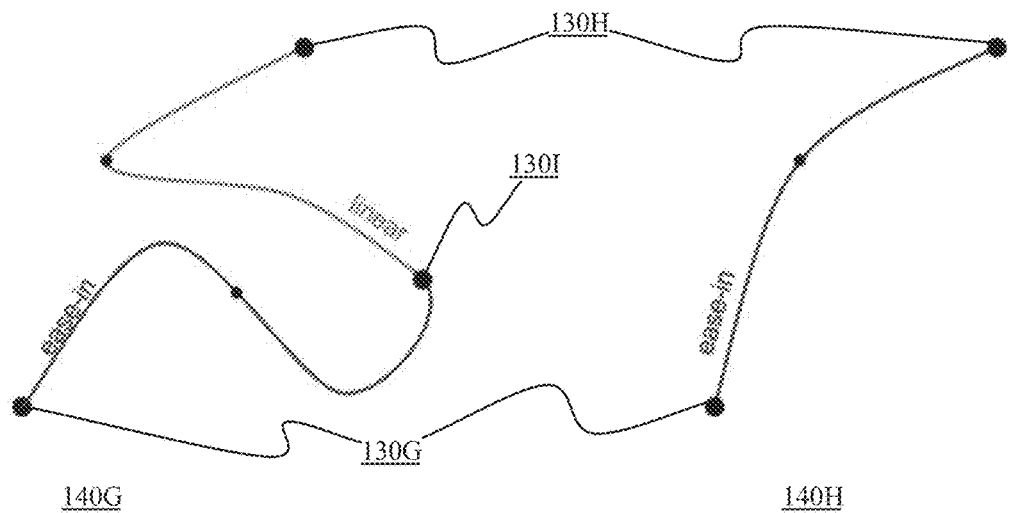

If a motion path control point is also a timeline key, it can be removed either by deleting that key through the timeline's context menu, or by removing the transform entry in the animated properties popup. Contributions to the transform animation from the motion path are not distinguished from the path element's own transform animation: if both the motion path and the element's transform are keyed, then both keys are removed. Removing a key (e.g. 130I) is interpreted as removing the motion path from the entire span (e.g. 130G to 130I), so all previous control points up to the previous key are deleted, as shown in FIG. 1K (e.g. leaving a single span from 130G to 130H). This ensures that a user can remove a motion path purely through the timeline UI, without also having to use the path tool to remove control points that are not at keys.

A motion path's timing can be altered by setting the easing at a span, which requires the keyframes rules for the associated path section to be recomputed. Timing can also be edited by moving keys in the timeline UI, and this only requires re-scaling of the key time sequences in the existing rules. For example, consider a motion path with timeline keys at 1 s and 2 s, and a generated keyframes rule with key time array [0%, 12%, 30%, 50%, 70%, and 100%]. The keys at 50% and 100% correspond to timeline keys, and the other keys are generated by the optimization. If the first timeline key is moved to 1.5 s, then the rule's new key time array is [0%, 18%, 45%, 75%, 85%, 100%], and the key values are not changed.

The timeline is ultimately responsible for generating all CSS relating to animation, so if a motion path exists, it's API provides the keys for each affected channel, and the timeline converts these into keyframes rules. If a timeline edit affects a property of the animation style rule, such as delay, duration, or loop count, then the changes are applied both to the element's style rule and to the motion path's style rules.

As with other animated quantities, if a media rule is active but the current motion path animation is defined in the base rules, then editing the motion path results in new keyframes rules (and possibly new style rules) being added to the media rule. Similarly, motion path animations are accounted for when a media rule is active and the system may want to know whether a timeline layer is using animations inherited from the base rules. This is useful during undo/redo, to remove/re-add new child rules from/to the active media rule.

Lastly, adding or editing a timeline label causes duplicate keyframes and animation style rules to be generated for that label. Motion path rules are similarly duplicated.

Figure 1L:
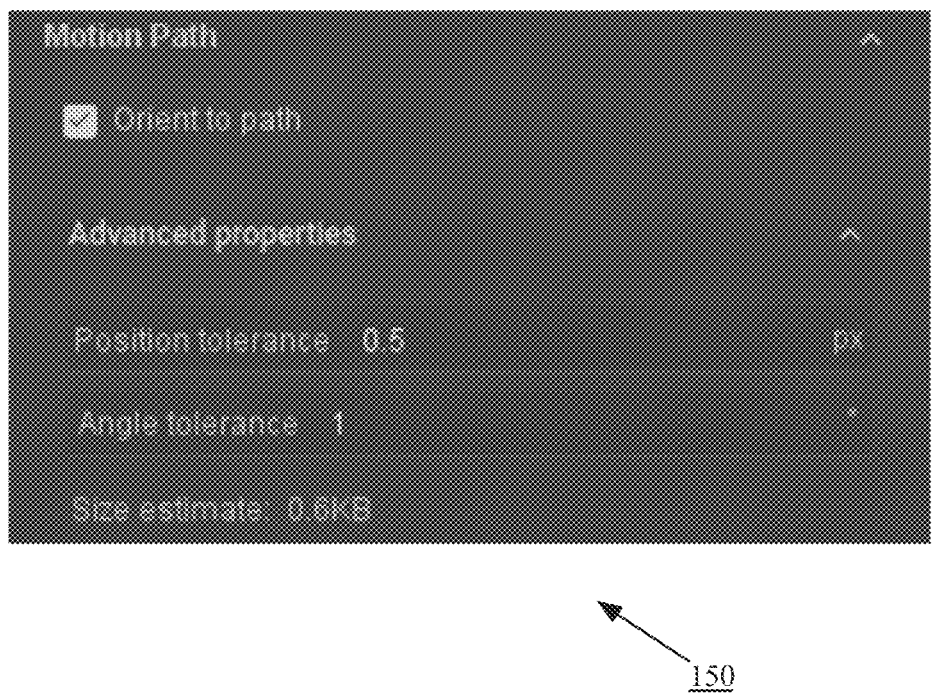
FIG. 1L is a screenshot of an implementation of a property inspector of an animation editor.

FIG. 1L is a screenshot of an example of a property inspector for a motion path. If an element with a motion path is selected, the PI shows a new section for motion path properties. The primary entry is a toggle and/or dropdown for enabling or disabling tangent following, but users can also enter an "advanced" section for controlling the error tolerances when fitting keyframes rules. Position animation uses one tolerance, measured in pixels, and orientation animation uses a different tolerance, measured in degrees. If tangent following is disabled, the orientation tolerance is disabled. Changes to any of these properties causes keyframes rules to be regenerated. To provide feedback on the tolerance setting, the panel also shows a size estimate as a read-only field; this estimate might be based on the number and type of segments in the keyframes rules. If multiple elements are selected, in some implementations, the motion path section is shown only if all elements have motion paths. This is consistent with other specialized sections, such as the one used for images.

Motion paths may be treated like other animation for copy/paste purposes: motion paths for top-level elements are discarded, but retained for child elements. When copying motion path animations, the naming conventions are preserved.

When (un)grouping or (un)wrapping an element with a motion path, the motion path animations are updated to reflect the change in coordinate system, just as with any other animations involving transforms. If a group is duplicated, or if an instance is ungrouped, then motion path animations are copied as necessary. Since this is similar to the logic needed for copy/paste, the motion path API can provide a single entry point for duplicating motion paths.

Timeline pause and goto events may be controlled by adding and removing classes to the animated element. If the element is on a motion path, then these classes may be also added to/removed from the intermediate elements added at publish time.

Figure 1M:
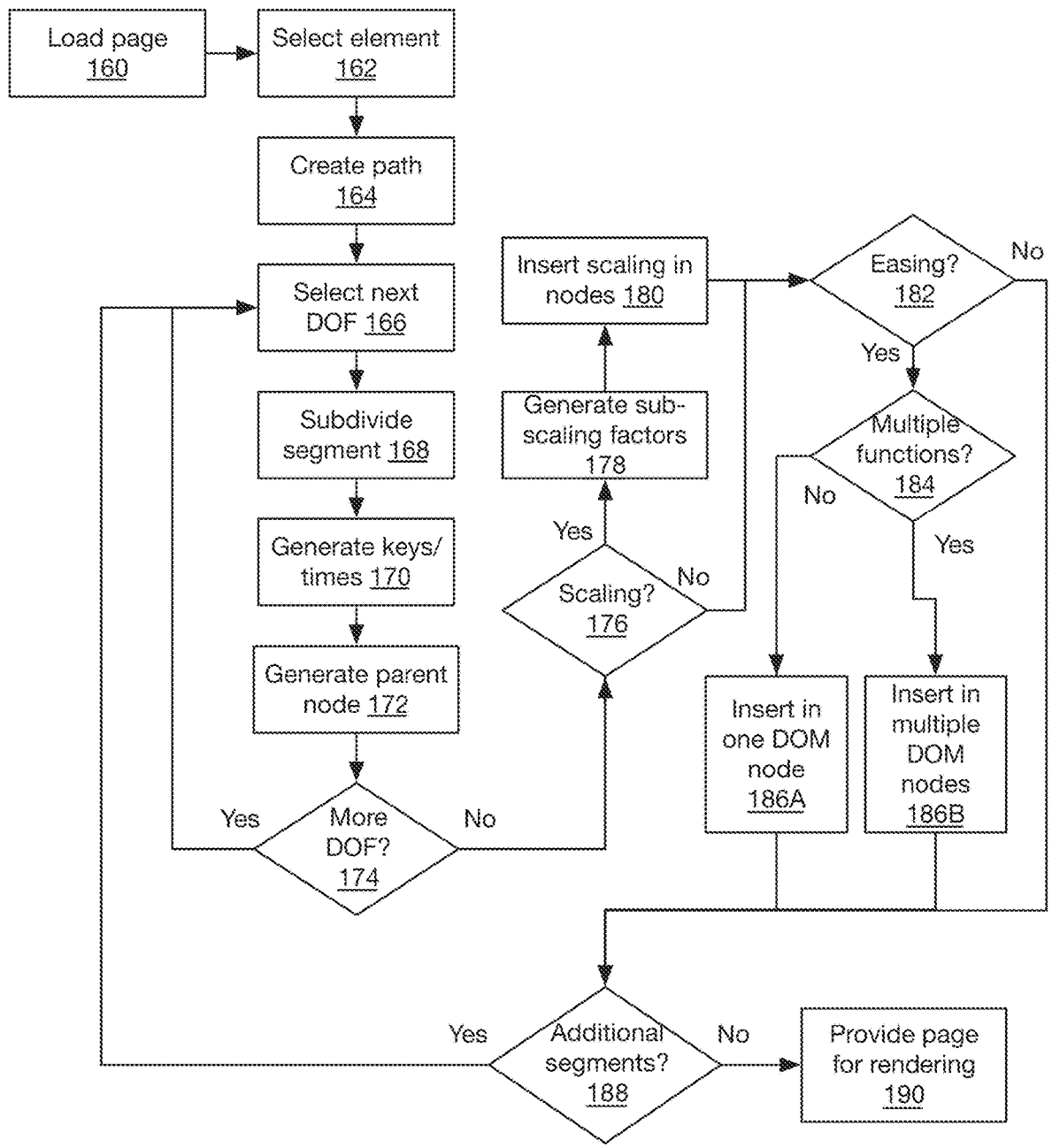
FIG. 1M is a flow chart of an implementation of a method for motion path animation.

FIG. 1M is a flow chart of an implementation of a method for motion path animation. At step 160, a page may be loaded into an editor or animator, either from local memory, from a network location (e.g. server, client device, etc.), or via any other such means. In some implementations, the page may be retrieved by the editor or animator, while in other implementations, the page may be provided to the editor or animator.

In some implementations, at step 162, the editor or animator may select an element to be animated. In some implementations, the animator or editor may receive an element to be animated (e.g. graphic, text, or other such element). In other implementations, the animator or editor may display a user interface, and a user may select an element to be animated. The element may be represented in the web page by a DOM element having one or more properties.

In some implementations, at step 164, the editor or animator may receive a path for the animation. In some implementations, the editor or animator may receive a path drawn or selected by a user via a user interface. In other implementations, the editor or animator may receive a path drawn or separately entered and transmitted to the editor or animator. For example, in some implementations, the path may be provided as one or more Bezier curves or Bezier curve segments forming a curve; one or more linear segments; one or more "jump" segments; or any other such representations. The path may comprise one or more degrees of freedom, such as an x translation, a y translation, a z translation (for three-dimensional environments), a yaw rotation, a roll rotation, and/or a pitch rotation. The path may also comprise one or more scaling operations, including an x scale, a y scale, and/or a z scale. In many implementations, the path may include combinations of these degrees of freedom (e.g. a first curve in the x and y planes, while pitching forward, then rotating in the z plane). Although referred to here as yaw, roll, and pitch, in many implementations, these rotations may be considered rotation around the x-axis, y-axis, and z-axis (and thus independent of a direction of motion or "face" of the animated element). In some implementations, the path may include other features, such as tangent following along a segment, and/or one or more easing functions including a plurality of easing functions applied to different segments or sub-segments of the curve.

In some implementations, at step 166, the editor or animator may select a first degree of freedom (e.g. a translation or rotation). The selection may be based on any characteristics. For example, in some implementations, the editor or animator may select degrees of freedom in a predetermined order. In other implementations, the editor or animator may select degrees of freedom based on an amount of movement in the corresponding direction or an amount of rotation.

In some implementations, at step 168, the editor or animator may subdivide a segment of the path into a plurality of sub-segments. As discussed above, segments may be sub-divided to determine optimal key times for identifying keys or control points of the translations and/or rotations, with motion between the key times interpolated. As discussed above, subdividing the segment may be performed iteratively to identify appropriate sized segments. In some implementations, at step 170, the editor or animator may generate keys and corresponding key times for control points of each Bezier curve segment, as discussed above. The keys may comprise rendering instructions for the translation or transformation in the selected degree of freedom (e.g. a set of coordinates and corresponding times).

In some implementations, at step 172, the editor or animator may generate a parent node of the node of the animated element within the DOM tree. The parent node may encapsulate the node of the animated element and may include, within the parent node, the rendering instructions or keys and key times.

In some implementations, at step 174, the animator or editor may determine if the animation path includes transformations or translations in additional degrees of freedom. As discussed above, in many implementations, rendering instructions within the tree may only refer to a single degree of freedom. Accordingly, if additional degrees of freedom are needed, steps 166-174 may be repeated iteratively for each additional degree of freedom. In such implementations, at step 172, each newly generate parent node may encapsulate the previously generated parent node (or nodes), which may similarly encapsulate the node for the element. Accordingly, as discussed above, the DOM tree may comprise a plurality of nodes in parent-child relationships, each node corresponding to a degree of freedom, with a lowest or final child node corresponding to the element. As the lower or child nodes inherit characteristics of parent nodes, the node corresponding to the element may take on the aggregate of the various rendering instructions corresponding to each degree of freedom.

As discussed above, in some implementations, animation may include scaling. In some implementations, at step 176, the editor or animator may determine if the segment of the path includes a scaling function. In some implementations, as discussed above, a scaling function may apply to one degree of freedom (e.g. enlarging in the x-plane, for example). In such implementations, at step 178, the editor or animator may generate the corresponding tag, and at step 180, insert the scaling instructions into the rendering instructions at the parent node associated with the corresponding degree of freedom. In other implementations, a scaling function may apply to multiple degrees of freedom (e.g. reducing the element size by 50%). As discussed above, in some such implementations, the animator or editor may determine scaling factors for each degree of freedom at step 178, and at step 180, the animator or editor may insert the scaling factors into each parent node associated with the corresponding degree of freedom. Thus, steps 176-180 may be performed iteratively for each degree of freedom. Although shown after step 174, in some implementations, steps 176-180 may be performed between steps 166 and 174 (e.g. after step 172), and may be repeated iteratively for each degree of freedom.

Similarly, as discussed above, animation may include easing functions or changes in velocity traversing a region of a curve. At step 182, the animator or editor may determine if an easing function is indicated in the animation instructions or path. Furthermore, as discussed above, in some implementations, only a single easing function may be included in any DOM node. Accordingly, to apply multiple easing functions along a path, in some implementations, at step 184, the animator or editor may determine if multiple easing functions are indicated. If not, at step 186A, the animator or editor may insert an easing function identifier into rendering instructions at one DOM node (for example, in some implementations, the first parent node having the element as a direct child; in other implementations, the top most generated parent node). If so, at step 186B, the animator or editor may insert a plurality of easing functions into a corresponding plurality of DOM nodes. During rendering, the set of easing functions from the plurality of DOM nodes may be aggregated to provide a plurality of easing functions to be applied to various regions of the curve.

In some implementations, the path may be divided into multiple Bezier and/or linear segments or jumps. In such implementations, at step 188, the editor or animator may determine if additional segments exist in the path. If so, then steps 166-188 may be repeated iteratively for each additional segment.

In some implementations, at step 190, the page may be provided for rendering or display by a second computing device. In some implementations, the generated DOM instructions may be extracted and inserted in a separate page or data file, such as a stylesheet, and referenced by an indicator within the page. During rendering, the browser may identify the indicator, retrieve the separate page or data file, and apply the rendering instructions.

Figure 2A:
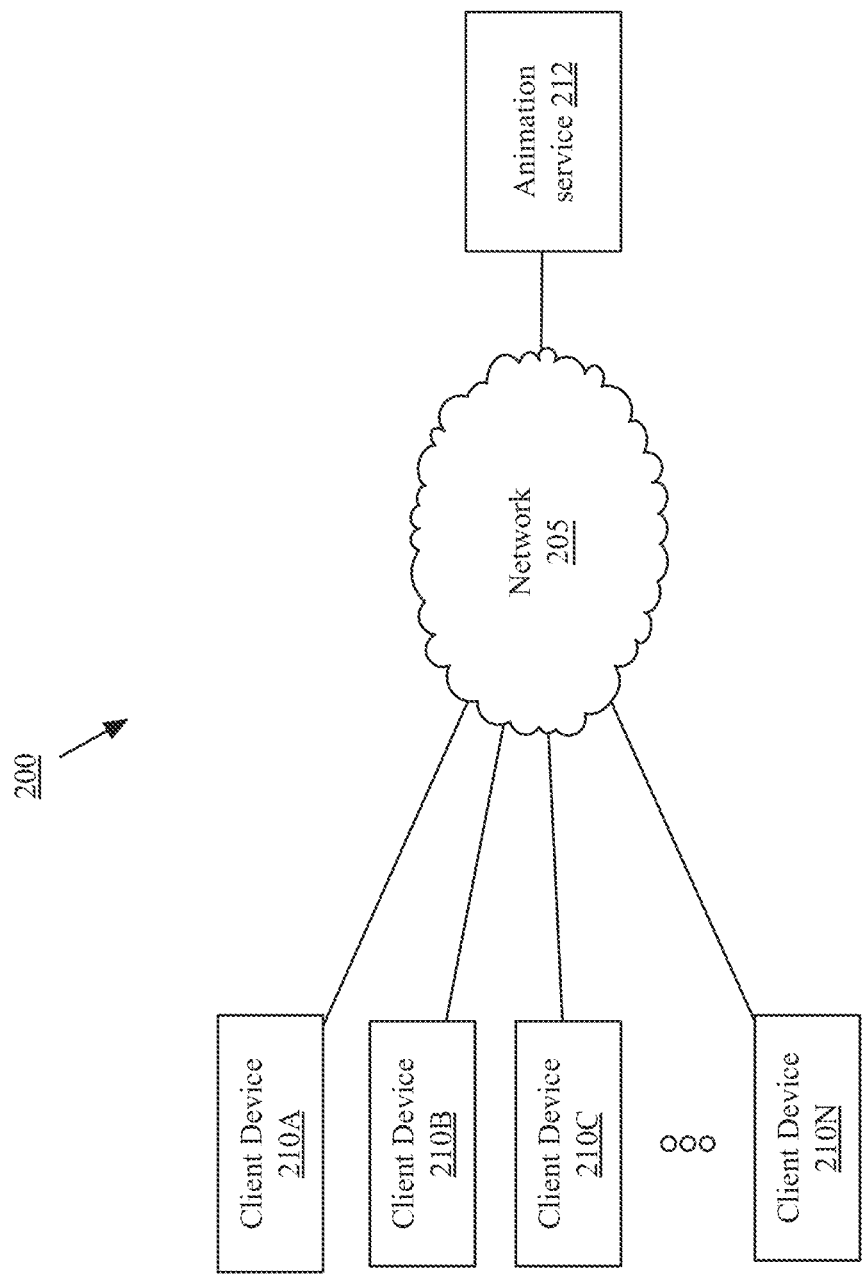
FIG. 2A is a block diagram of an animation environment, according to one implementation.

FIG. 2A is a block diagram of an animation environment 200, according to one implementation. A network 205 may connect one or more client devices 210A-210N (referred to generally as client device(s) 210); and an animation service 212.

Still referring to FIG. 2A and in more detail, network 205 may be any form of computer network or combinations of networks that relay information between client devices 210 and one or more animation services 212, as well as other devices not illustrated. Network 205 may include the Internet and/or other types of data networks, such as a local area network (LAN), a wide area network (WAN), a cellular network, satellite network, or other types of data networks. Network 205 may also include any number of computing devices (e.g., computer, servers, routers, network switches, etc.) that are configured to receive and/or transmit data within network 205. Network 205 may further include any number of hardwired and/or wireless connections. A client device 210 may communicate wirelessly (e.g., via WiFi, cellular, radio, etc.) with a transceiver that is hardwired (e.g., via a fiber optic cable, a CAT5 cable, etc.) to other computing devices in network 205. In some implementations, a network 205 may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Client device(s) 210 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 205. In some implementations, a client device 210 may execute an application, service, server, daemon, routine, or other executable logic for communicating over a network 205, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 205, such as an Ethernet or WiFi interface. In other implementations, client device 210 may receive content via network 205 and may transmit identifications of interactions via network 205.

A content provider (not illustrated) may include one or more computing devices connected to network 205 and configured for providing content to a client 210, either directly or via an animation service 212. A content provider may be referred to variously as a content provider, server, web server, data server, publisher, service provider, or by other similar terms. In many implementations, content provider may include a plurality of computing devices configured as a server farm or cloud, and may include routers, load balancers, network address translators, firewalls, or other such devices. Content providers may be computer servers (e.g., FTP servers, file sharing servers, web servers, etc.) or combinations of servers (e.g., data centers, cloud computing platforms, etc.). Content providers may provide any type and form of content, including text, images, video, audio, multimedia, or other data, or any combination of these. Content may include live media content, prerecorded media content, rendered content, movies, television shows, podcasts, video blogs, video games or other interactive content, advertising in any format, social media, or any other type and form of content.

Figure 2B:
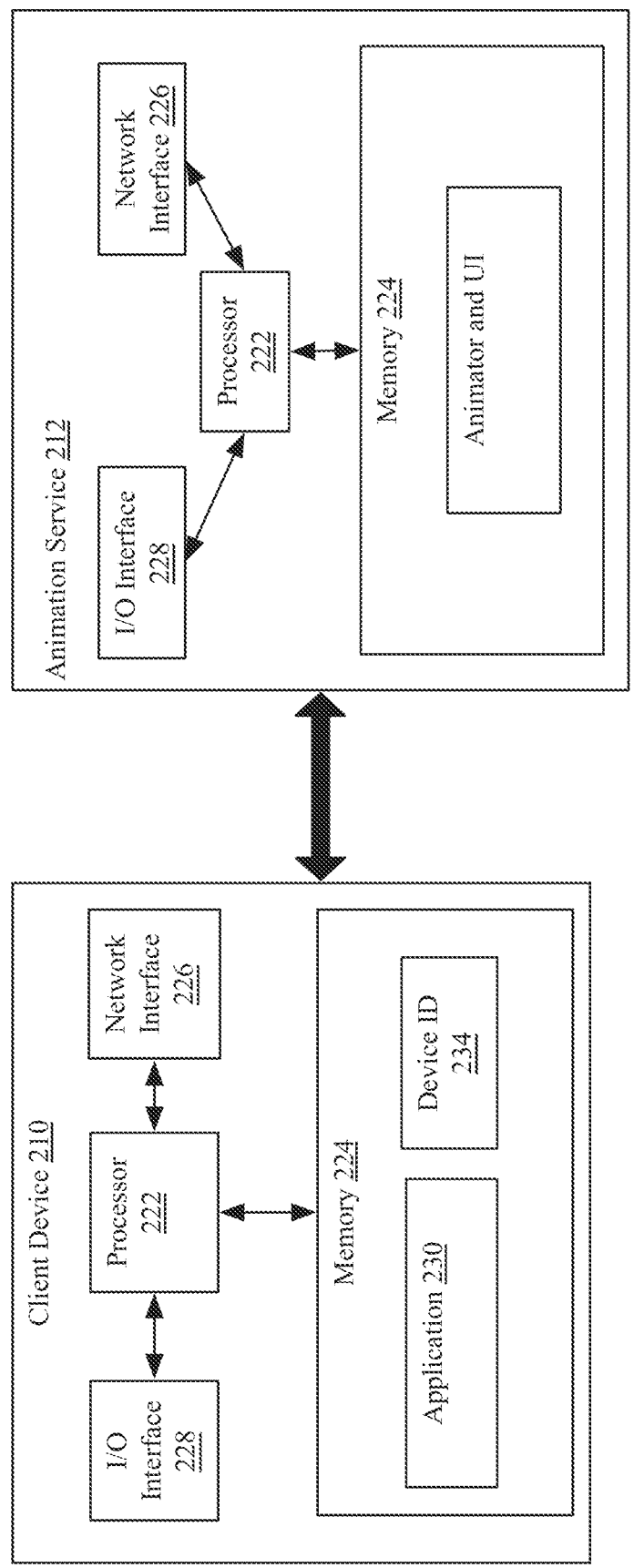
FIG. 2B is a block diagram of client and server devices shown in FIG. 2A, according to one implementation.

FIG. 2B is a block diagram of client and server devices shown in FIG. 2A, according to one implementation. Referring first to client device 210, a client device may be a computing device of a client or audience member of a live media stream. Client device 210 may be any number of different types of user electronic devices configured to communicate via network 205, including without limitation, a laptop computer, a desktop computer, a tablet computer, a smartphone, a digital video recorder, a set-top box for a television, a video game console, or any other type and form of computing device or combinations of devices. In some implementations, the type of client device 210 may be categorized as a mobile device, a desktop device or a device intended to remain stationary or configured to primarily access network 205 via a local area network, or another category of electronic devices such as a media consumption device.

In many implementations, client device 210 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C#, Java, JavaScript, Perl, HTML, XML, Python and Visual Basic.

Client device 210 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, client device 210 may include a plurality of network interfaces 226 of different types, allowing for connections to a variety of networks 205 or a network 205 such as the Internet via different sub-networks. Client device 210 may also include other interfaces for receiving terrestrial, satellite, or cable analog or digital broadcasts, as discussed above.

Client device 210 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 210, such as a built-in display, touch screen, microphone, etc., or external to the housing of client device 210, such as a monitor connected to client device 210, a speaker connected to client device 210, etc., according to various implementations.

Client device 210 may include in memory 224 an application 230 or may execute an application 230 with a processor 222. Application 230 may be an application, applet, script, service, daemon, routine, or other executable logic for receiving content and displaying or otherwise outputting content via an output interface 228 of the client device (e.g. display, speaker, etc.). In one implementation, application 230 may be a web browser. Application 230 may include functionality for displaying content received via network interface 226 and/or generated locally by processor 222. In some implementations, application 230 may be a media player or include an embedded media player, such as a plug-in or native media player within a web browser. Application 230 may provide user interfaces for interacting with content played in the media player, such as a skip control, dislike button, or any similar interface.

Client 210 may include or be identified with a device identifier 234. Device identifier 234 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 234 may be fixed to the device or preconfigured in the device, such as a manufacturer serial number or MAC address, while in other implementations, the device identifier 234 may be dynamically set by a content provider, streaming server, application 230, or other entity, such as a cookie or username. In some implementations, a unique or new device identifier 234 may be set for each communication to a content provider and/or audience measurement server, while in other implementations, the device identifier 234 may not be changed, or may be changed periodically (e.g. hourly, daily, weekly, etc.) or at other intervals (e.g. on restart of the client device, login to an internet service, etc.). In some implementations, a device identifier 234 may be associated with one or more other device identifiers 234 (e.g., a device identifier for a mobile device, a device identifier for a home computer, etc.). In many implementations, as discussed above, a device identifier 234 may be generated and/or transmitted to the device 210 by a content provider. In other implementations, as discussed above, client 210 may request a device identifier or cookie 234 from a measurement service or content provider, and may transmit the device identifier or cookie 234 to the measurement service or content provider in association with requests for content or measurement data.

Also illustrated in FIG. 2B is a block diagram of an implementation of a device or server of an animation service 212. As with client devices 210, animation service 212 may include one or more processors 222, memories or storage devices 224, network interfaces 226, and user interfaces 228. In some implementations referred to as headless servers, a server 212 may not include a user interface 228, but may communicate with clients 210 or panel providers with user interfaces 228 via a network 205. In some implementations, memory 224 may store one or more applications for execution by processor 222 of the server, including FTP servers, web servers, mail servers, file sharing servers, peer to peer servers, or other such applications for delivering content or redirection commands to allow clients to access content at a content provider. Server 212 may execute an animator for calculation motion as discussed above.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method of generating animations, comprising:
   receiving, by a computing device, an element corresponding to a first node of a document object model (DOM) tree;
   identifying, by the computing device, a segment corresponding to a motion path for the element, the segment having a degree of freedom;
   inserting, by the computing device, into the DOM tree, a second node having the first node as a child to include a characteristic of the first node, the second node defining a rendering instruction in the degree of freedom along the segment of the motion for the element; and
   storing, by the computing device, the DOM tree including the first node and the second node for animation of the element.

2. The method of claim 1, further comprising receiving, by the computing device, the motion path along which the element is to be animated, the motion path having a plurality of degrees of freedom.

3. The method of claim 1, further comprising generating, by the computing device, a sequence of keys and key times corresponding to the degree of freedom along the segment, each key of the sequence defining the rendering instruction for at least one of translation or transformation in the degree of freedom.

4. The method of claim 1, further comprising generating, by the computing device, responsive to determining that scaling is to be applied, a scaling factor to insert in the second node of the DOM tree to define the rendering instruction to apply scaling along the degree of freedom.

5. The method of claim 1, further comprising inserting, by the computing device responsive to identifying an easing instruction in the motion path, a corresponding easing function in the second node of the DOM tree to define an alteration rate of animation in the rendering instruction.

6. The method of claim 1, further comprising dividing, by the computing device, the segment into a plurality of subsegments according to a plurality of sampling points and interpolation between pairs of sampling points in the plurality of sample points.

7. The method of claim 1, wherein receiving the element further comprises selecting, from a plurality of elements to be presented on one or more webpages, the element to be animated.

8. The method of claim 1, wherein storing the DOM tree further comprises generating a set of keyframe rules to animate the element in accordance with the rendering instruction.

9. The method of claim 1, further comprising iteratively inserting, by the computing device, into the DOM tree, additional parent nodes for each additional degree of freedom of a plurality of degrees of freedom.

10. The method of claim 1, further comprising providing, by the computing device, the DOM tree including the first node and the second node for animation of the element on a webpage.

11. A system for generating animations, comprising:
a computing device having one or more processors coupled with memory, configured to:
receive an element corresponding to a first node of a document object model (DOM) tree;
identify a segment corresponding to a motion path for the element, the segment having a degree of freedom;
insert, into the DOM tree, a second node having the first node as a child to include a characteristic of the first node, the second node defining a rendering instruction in the degree of freedom along the segment of the motion for the element; and
store the DOM tree including the first node and the second node for animation of the element.

12. The system of claim 11, wherein the computing device is further configured to receive the motion path along which the element is to be animated, the motion path having a plurality of degrees of freedom.

13. The system of claim 11, wherein the computing device is further configured to generate a sequence of keys and key times corresponding to the degree of freedom along the segment, each key of the sequence defining the rendering instruction for at least one of translation or transformation in the degree of freedom.

14. The system of claim 11, wherein the computing device is further configured to generate, responsive to determining that scaling is to be applied, a scaling factor to insert in the second node of the DOM tree to define the rendering instruction to apply scaling along the degree of freedom.

15. The system of claim 11, wherein the computing device is further configured to insert, responsive to identifying an easing instruction in the motion path, a corresponding easing function in the second node of the DOM tree to define an alteration rate of animation in the rendering instruction.

16. The system of claim 11, wherein the computing device is further configured to divide, the segment into a plurality of sub-segments according to a plurality of sampling points and interpolation between pairs of sampling points in the plurality of sample points.

17. The system of claim 11, wherein the computing device is further configured to select, from a plurality of elements to be presented on one or more webpages, the element to be animated.

18. The system of claim 11, wherein the computing device is further configured to generate a set of keyframe rules to animate the element in accordance with the rendering instruction.

19. The system of claim 11, wherein the computing device is further configured to iteratively insert, into the DOM tree, additional parent nodes for each additional degree of freedom of a plurality of degrees of freedom.

20. The system of claim 11, wherein the computing device is further configured to provide the DOM tree including the first node and the second node for animation of the element on a webpage.

* * * * *